United States Patent
Reister

(10) Patent No.: US 7,986,702 B1
(45) Date of Patent: Jul. 26, 2011

(54) METHOD AND SYSTEM FOR STREAMING MULTIMEDIA TRANSMISSIONS

(75) Inventor: John Reister, Palo Alto, CA (US)

(73) Assignee: BigBand Networks Inc., Redwood City, CA (US)

(*) Notice: Subject to any disclaimer, the term of this patent is extended or adjusted under 35 U.S.C. 154(b) by 302 days.

(21) Appl. No.: 12/323,486

(22) Filed: Nov. 26, 2008

Related U.S. Application Data

(60) Provisional application No. 60/990,963, filed on Nov. 29, 2007.

(51) Int. Cl.
*H04L 12/28* (2006.01)
*H04L 12/56* (2006.01)
*H04H 20/71* (2008.01)

(52) U.S. Cl. .......... 370/401; 370/312; 370/390; 725/34; 725/38

(58) Field of Classification Search .......... 370/312, 370/390; 725/34, 38
See application file for complete search history.

(56) References Cited

U.S. PATENT DOCUMENTS

| | | | |
|---|---|---|---|
| 2006/0002552 A1* | 1/2006 | LeComte et al. | 380/217 |
| 2007/0266398 A1* | 11/2007 | Vandaele | 725/38 |
| 2009/0106792 A1* | 4/2009 | Kan et al. | 725/34 |

* cited by examiner

*Primary Examiner* — Pankaj Kumar
*Assistant Examiner* — Lonnie Sweet

(57) ABSTRACT

A customer-premises equipment (CPE) gateway and methods for operation thereof, and a multimedia server and methods for operation thereof are disclosed, the method for the CPE gateway, the method including: (a) receiving, by the CPE gateway, a first IGMP compliant command; (b) generating by the CPE gateway, in response to the first IGMP compliant command, a unicast command that instructs a multimedia server to generate a unicast media stream; wherein the generating includes concealing multicast information from at least one IGMP compliant entity that follows the CPE gateway; and (c) transmitting, by the CPE gateway, the unicast command to the at least one IGMP compliant entity; wherein the unicast command passes through the at least one IGMP compliant entity and reaches the multimedia server.

12 Claims, 15 Drawing Sheets

610 receiving by a multimedia server a unicast command; wherein the unicast command is generated by a CPE gateway in response to a IGMP command; wherein the unicast command is sent to the multimedia server via the at least one IGMP compliant entity; wherein the unicast command passes through the at least one IGMP compliant entity and reaches the multimedia server 611 receiving a unicast command that was generated by the CPE gateway in response to a first IGMP compliant command issued by a multimedia end-unit 612 receiving a unicast command that includes unicast request information which facilitates generation of a unicast media stream responsive to the unicast request information 613 receiving a multicast command that includes multicast request information which facilitates a transmission of a multicast media stream responsive to the multicast request information 614 receiving a unicast command that pertains to a switching from a first multicast media stream to a second multicast media stream

620 determining, by the multimedia server, to transmit to a CPE gateway a media stream that is not currently transmitted to the CPE gateway 621 determining to transmit to the CPE gateway a unicast media stream 622 determining to transmit the media stream in response to the unicast command 623 determining to transmit to the CPE gateway a dedicated media stream 624 determining to transmit the media stream that is not currently transmitted to the CPE gateway in response to content of a media stream that is currently transmitted to the CPE gateway

630 generating, by the multimedia server, a media stream for transmitting to the CPE gateway 631 generating a unicast media stream 632 generating the media stream in response to request information included in the unicast command 633 generating the media stream in response to a second media stream that is received from a media source 634 generating a dedicated media stream, wherein at least a portion of the content of the dedicated media stream is selected to match user identification information

FIG. 4B

METHOD AND SYSTEM FOR STREAMING MULTIMEDIA TRANSMISSIONS

RELATED APPLICATIONS

This application claims the priority of U.S. provisional patent Ser. No. 60/990,963, filing date 29 Nov., 2007.

FIELD OF THE INVENTION

The invention relates to methods and systems for streaming multimedia transmissions.

BACKGROUND OF THE INVENTION

FIG. 1 illustrates prior art multimedia system 12. Server 60 provides multiple multicast media streams to multiple end units 20 (which may be set-top boxes, as illustrated in the figure, or other types of end units), via several intermediate systems such as network routers 50 (which may also have Ethernet aggregation switch (EAS) functionalities), digital subscriber line access multiplexers (DSLAM) 40, prior-art customer-premises equipment (CPE) gateways 30. It is noted that while only two routes to multimedia end units 20 that are served by two prior-art CPE gateways 30 which are served by a single network router 50 and/or a single DSLAM 40 are illustrated, it is clear to a person who is skilled in the art that such multimedia systems are adapted to served much larger numbers of subscribers, and that the diagram is offered for illustration and exemplification purposes only.

Each of the multimedia end units 20 is usually adapted to receive very few concurrent multicasted media streams from the network (a media stream of a TV channel being viewed, for example, as well as potentially other TV channel being recorded for later viewing). Each of those multicasted media streams is transmitted to multiple subscribers according to IP multicast groups that are usually managed by the server 60 (it is noted that multimedia content may be provided to the server from one or more multimedia content providers 70).

In order to switch from one multicasted media stream to another, an internet group management protocol (IGMP) compliant command is issued by the multimedia end unit 20, informing the server that this multimedia end unit 20 wishes to leave a first IP multicast group (associated with the currently transmitted multicasted media stream)—which is known as a "leave" IGMP compliant command, and another IGMP compliant command is issued by the multimedia end unit 20, informing the server that this multimedia end unit 20 want to join a second IP multicast group (associated with the desired multicasted media stream)—which is known as a "join" command. The switching between the two media streams according to these prior art system requires considerable amount of time.

SUMMARY OF THE INVENTION

A customer-premises equipment (CPE) gateway, including: (a) a first interface for receiving a first internet group management protocol (IGMP) compliant command; (b) a processor for generating, in response to the first IGMP command, a unicast command that instructs a multimedia server to generate a unicast media stream; and for concealing multicast information from at least one IGMP compliant entity that follows the CPE gateway; and (c) a second interface for transmitting the unicast command to the at least one IGMP compliant entity; wherein the unicast command passes through the at least one IGMP compliant entity and reaches the multimedia server.

A multimedia server, including: (a) a media stream generator for generating a unicast media stream; (b) a first server interface for: receiving from a customer-premises equipment (CPE) gateway a unicast command; wherein the unicast command is generated by the CPE gateway in response to an internet group management protocol (IGMP) command; wherein the unicast command is sent to the multimedia server via the at least one IGMP compliant entity; wherein the unicast command passes through the at least one IGMP compliant entity and reaches the multimedia server; and for transmitting the unicast media stream to the CPE gateway; and (c) a processor for determining media streams switching time metadata; wherein the first server interface is further for: transmitting to the CPE gateway an instruction to switch from a reception and a transmission of the unicast media stream to a reception and a transmission of a second multicast media stream, wherein the instruction includes the media streams switching time metadata; and for transmitting the second multicast media stream to the CPE gateway, wherein the transmitting of the second multicast media stream starts substantially at a media streams switching time that corresponds to the media streams switching time metadata.

A method for a CPE gateway, the method including: (a) receiving, by the CPE gateway, a first IGMP compliant command; (b) generating by the CPE gateway, in response to the first IGMP compliant command, a unicast command that instructs a multimedia server to generate a unicast media stream; wherein the generating includes concealing multicast information from at least one IGMP compliant entity that follows the CPE gateway; and (c) transmitting, by the CPE gateway, the unicast command to the at least one IGMP compliant entity; wherein the unicast command passes through the at least one IGMP compliant entity and reaches the multimedia server.

A method for generating a media stream, the method including: (a) receiving by a multimedia server a unicast command; wherein the unicast command is generated by a customer-premises equipment (CPE) gateway in response to an internet group management protocol (IGMP) command; wherein the unicast command is sent to the multimedia server via the at least one IGMP compliant entity; wherein the unicast command passes through the at least one IGMP compliant entity and reaches the multimedia server; (b) generating, by the multimedia server, a unicast media stream; (c) transmitting, by the multimedia server, the unicast media stream to the CPE gateway; (d) determining, by the multimedia server, a media streams switching time metadata; (e) transmitting to the CPE gateway, by the multimedia server, an instruction to switch from a reception and a transmission of the unicast media stream to a reception and a transmission of a second multicast media stream, wherein the instruction includes the media streams switching time metadata; and (f) transmitting, by the multimedia server, the second multicast media stream to the CPE gateway, wherein the transmitting of the second multicast media stream starts substantially at a media streams switching time that corresponds to the media streams switching time metadata.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which:

FIGS. 4A and 4B illustrate a method for an operation of a multimedia server, according to an embodiment of the invention;

DETAILED DESCRIPTION OF THE DRAWINGS

Figure 1:
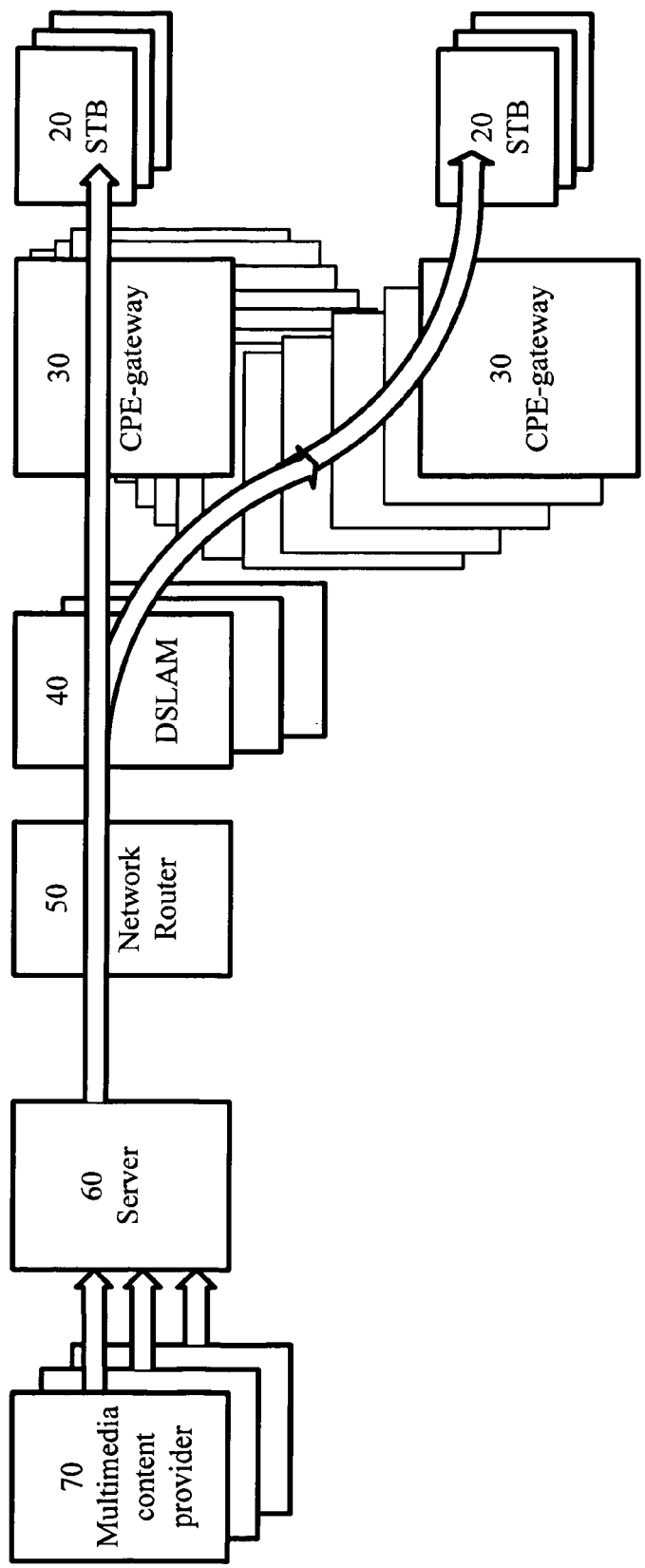
FIG. 1 illustrates a prior art multimedia system.
Figure 2A:
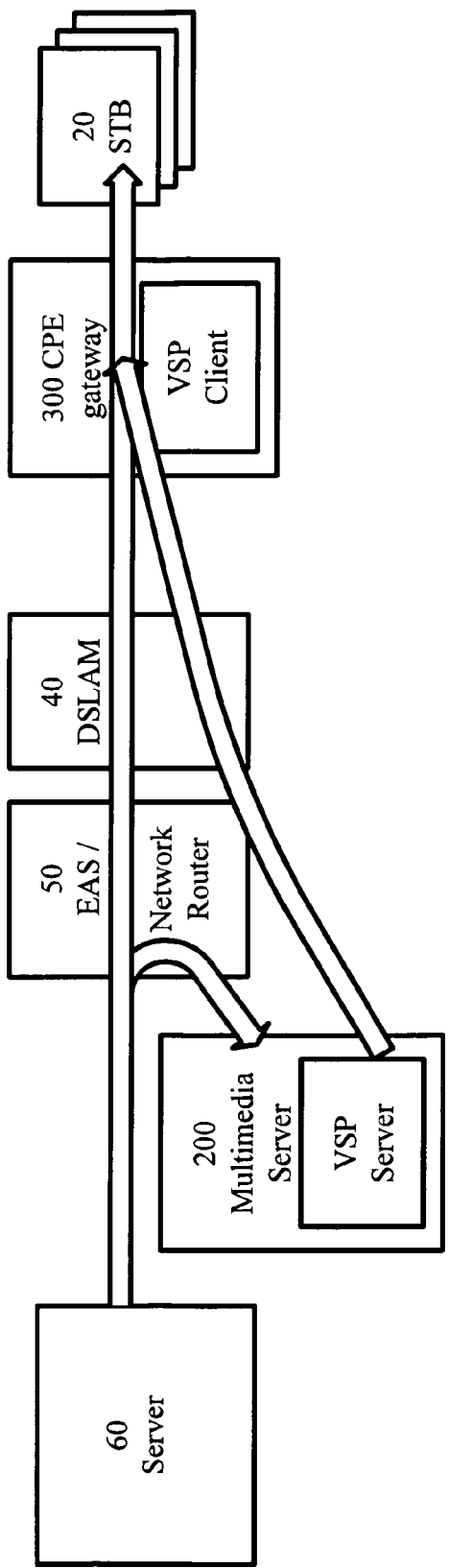
FIGS. 2A, 2B, 2C and 2D illustrate multimedia systems, according to different embodiments of the invention.

FIG. 2A illustrates multimedia system 10, according to an embodiment of the invention. Multiple end units 20 (which may be set-top boxes, as illustrated in the figure, or other types of end units, which may have non-multimedia functionalities as well) are adapted to receive multicasted multimedia content via customer-premises equipment (CPE) gateway 300 (also referred to as CPE residential gateway, home gateway and so forth. It is noted that CPE gateway 300 may incorporate different functionalities, such as those commonly associated with a gateway, an IP router, an Ethernet switch, a WiFi access point, and so forth, but this is not necessarily so).

It is noted that, conveniently, some components of multimedia system 10 are substantially similar to those installed in a previous multimedia system 12 (e.g. servers 60, network routers 50, DSLAMs 40, and multimedia end units 20), thus enabling an easy, expeditious and inexpensive upgrading of existing multimedia systems (such as systems 12) to multimedia systems 10 which follows the teachings of the current invention. It is noted that for the convenience of explanation, duplicate components of multimedia system 10 are not illustrated, while it is clear that many components (e.g. as illustrated in relation to multimedia system 12) similar to those illustrated would usually operate in multimedia system 10 in a manner similar to the one herein discussed, for the providing of multimedia content for numerous subscribers.

At least two components of multimedia system 10 are new in respect to prior art multimedia systems, which are CPE gateway 300 and multimedia server 200, which are able to communicate with each other (as well as with other components) in order to facilitate the new functionalities of multimedia system 10. CPE gateway 300 and multimedia server 200 cooperate to provide multimedia content provided by multimedia server 200 to multimedia end unit 20, in the manner discussed below.

It is noted that the multimedia content so provided may be responsive to content that is provided to multimedia server 200 by a server such as server 60 (e.g. for allowing expedite zapping), content that is provided to multimedia server 200 by other source (not illustrated, wherein the providing may be streaming or non-live), content generated by multimedia server 200, or any combination of the above. It is noted that conveniently, the operation of multimedia server 200 and CPE gateway 300 is transparent to multimedia end unit 20.

Figure 2B:
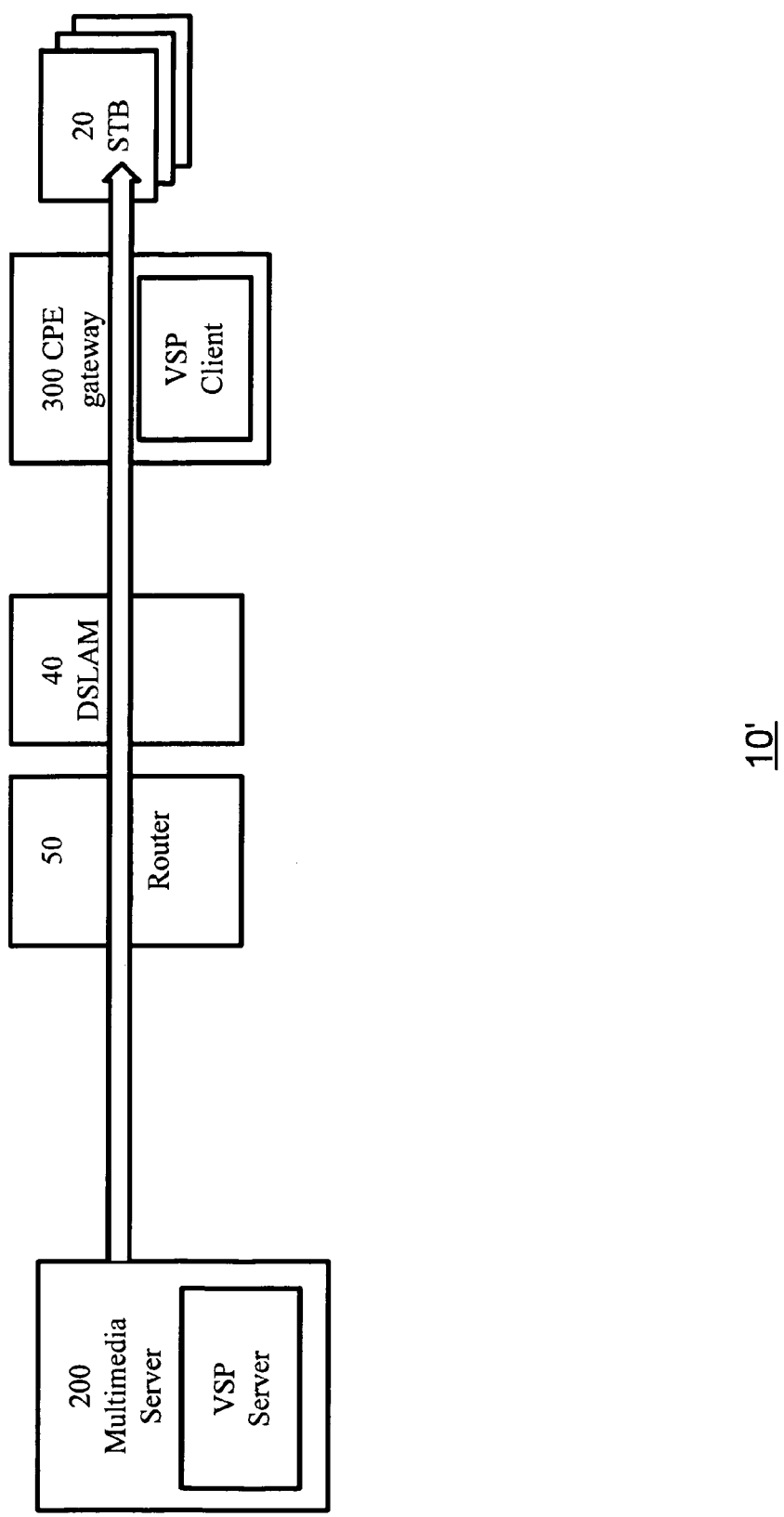
Figure 2C:
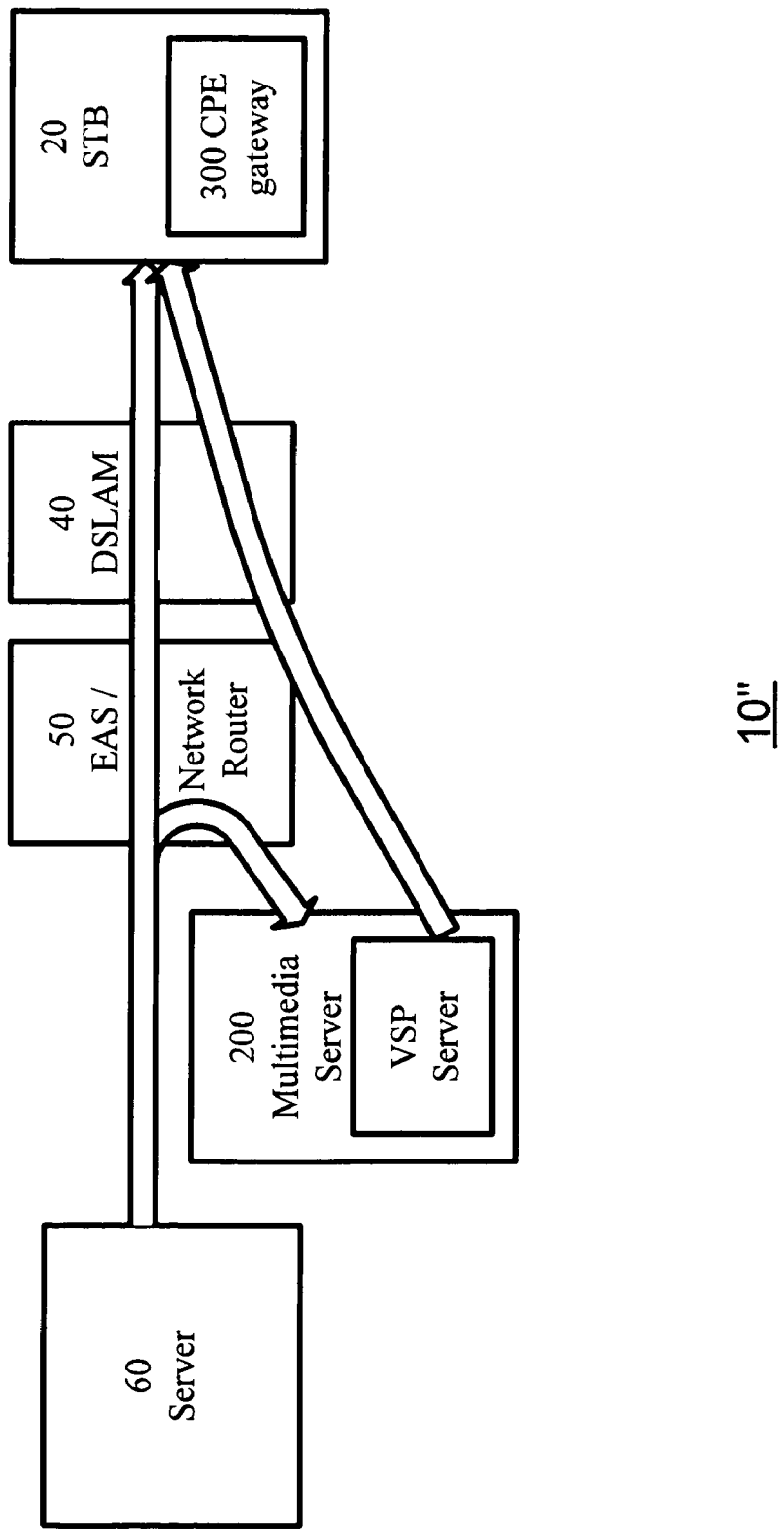

It should further be noted that while many examples of implementations of the invention herein disclosed refer to systems which implement DSLAM and other components as discussed for example in relation to FIGS. 2A through 2C, the invention could be also implemented in different kinds of IPTV systems, and especially in Fiber To The Premises systems (such as FTTH systems). For example, the IGMP compliant entity may be a DSLAM, but may also be a component of a passive optical network (PON) such as an OLT (optical line termination), or a wireless radio access network (RAN) element, as well as other implementations.

It will be clear that the invention is intended to provide solutions in the DSL (xDSL) world. It is noted that, according to an embodiment of the invention, CPE gateway 300 may be a standard CPE gateway into which improvements are incorporated (by way of software, hardware, firmware, or any combination thereof) in order to facilitate the operations as herein disclosed. In the figures this is illustrated by the box denoted "VSP client" (wherein VSP stands for Video-edge Services Protocol, which is a title given to the protocol shared between CPE gateway 300 and multimedia server 200). However, CPE gateway 300 may also be a dedicated CPE gateway.

Figure 2D:
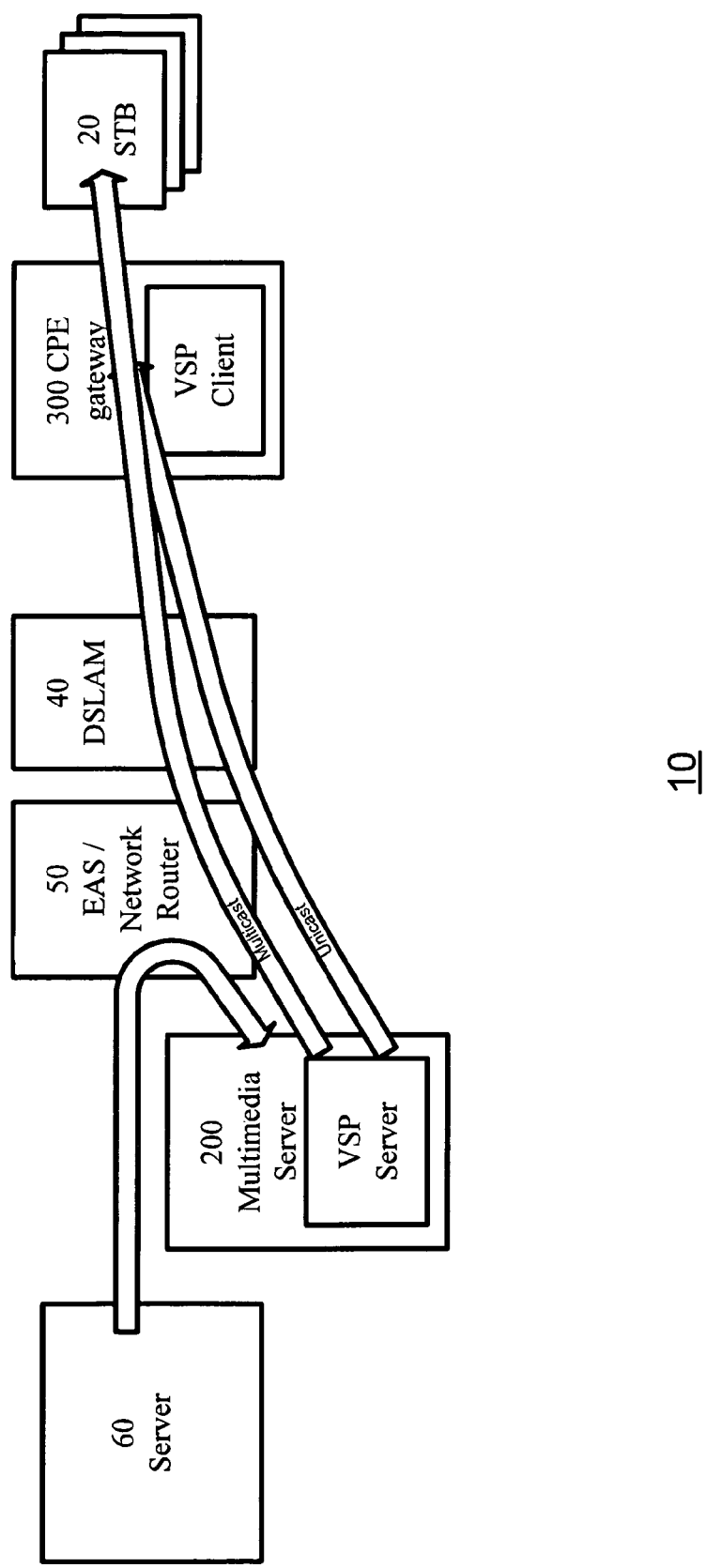

It is noted that, according to an embodiment of the invention, the multicast stream is not being split inside network router 50, as shown in FIGS. 2A and 2C, but rather is transmitted to multimedia server 200, wherein multimedia server 200 is further adapted to re-emit the multicast stream down the network. Such an embodiment of the invention is illustrated, for example, in FIG. 2D.

It is noted that according to an embodiment of the invention, multimedia server 200 may be a standard multimedia server, into which additional capabilities improvements are incorporated (by way of software, hardware, firmware, or any combination thereof) in order to facilitate the operations as herein disclosed. In the figures this is illustrated by the box denoted "VSP server". However, multimedia server 200 may also be a dedicated multimedia server. It is noted that embodiment of the invention in which a single multimedia server 200 incorporates the functionalities of server 60 (not denoted in FIG. 2B) with those of multimedia server 200 discussed below in illustrated in FIG. 2B.

FIG. 2C illustrates an embodiment of the invention in which the multimedia end unit 20 (denoted STB) includes the CPE gateway 300 (or functionalities of which) as an incorporated module. It is noted that, according to an embodiment of the invention, the incorporated CPE gateway may be implemented on at least partially the same hardware, software, or firmware components (e.g. processes carried out by a single processor), or on distinctive components. In such embodiments of the invention, the CPE gateway 300 may serve only the multimedia end unit 20 in which it resides, or be further adapted to serve other multimedia end units 20 connected to the multimedia end unit 20 in which it resides.

The cooperation of CPE gateway 300 and of multimedia server 200, according to different aspects of the invention (which may be implemented as apparatuses as well as processes), may be utilized in different cases, among which are the following applications in IPTV environment:

a. Rapid Zap;
b. Addressable advertising;
c. Re transmission;
d. Link management.

As for rapid zapping, in order for multimedia server 200 to provide this function there is a need to capture each channel change operation done in multimedia end unit 20 (e.g. STB)

and handle it. This is done by CPE gateway 300 (and especially by the VSP client, if so implemented), which translates a channel change events into a sequence of operations. In the case where CPE gateway 300 resides in the CPE-RG this trigger includes of mapping the "leave" operation to a TEARDOWN operation in the VSP, and a "join" request to SETUP and PLAY operations. To make the translation simple CPE gateway 300 and multimedia server 200 may use the multicast address as a unique identifier of the program in the lineup. Once a PLAY_ACK message was issued by multimedia server 200, CPE gateway 300 will start getting unicast packets destined to a pre defined port specified in the SETUP_ACK message. These packets should be terminated in the CPE gateway 300 and converted to the multicast expected by the multimedia end unit 20. After few seconds (triggered by multimedia server 200) a REDIRECT command should be issued by multimedia server 200 instructing CPE gateway 300 to stop listening to unicast and perform an IGMP join to the actual multicast. At this point multimedia server 200 will stop emitting unicast packets and start (if it is the first one to see this program) emitting the multicast. In order to make this transition smooth (video wise) re-stamping of the RTP sequence number may be implemented in the CPE gateway 300.

As for addressable advertising, providing addressability involves dynamic transition from multicast to unicast and back. The transition is done by the REDIRECT VSP command issued by multimedia server 200 system just before the ad break. This is highly similar to the REDIRECT command issued in the channel change scenario. The only exception is that for addressable advertising the transition is bi-directional. First CPE gateway 300 will be asked to move from multicast to unicast and once the commercial break ends it will be asked to switch back to the original multicast. This transition will usually require handling the RTP sequence numbering in the CPE gateway 300 as well.

As for retransmission, the main reasoning for retransmission is due to bad DSL links where packets get dropped. CPE gateway 300 may identify packet loss according to the RTP sequence numbers attached to each packet. In the case where a lost packet is identified, CPE gateway 300 is expected to issue a RETRANSMIT request to multimedia server 200, and the last is expected to resend this packet again. Retransmission requires book keeping operation on the client side that keeps tracks on missing packets in a 100-200 milliseconds window. In order to avoid unnecessary RETRANSMIT requests in channel change and splicing events, first RTP packet in each case will be marked, according to an embodiment of the invention, by multimedia server 200 to notify CPE gateway 300 on the next expected RTP packets sequence number.

As for link management, CPE gateway 300 may take an important role in managing and maintaining the link between CPE gateway 300 and multimedia server 200. This may consist of messages exchange (e.g. KEEP_ALIVE, OPTIONS) and handling.

Figure 3A:
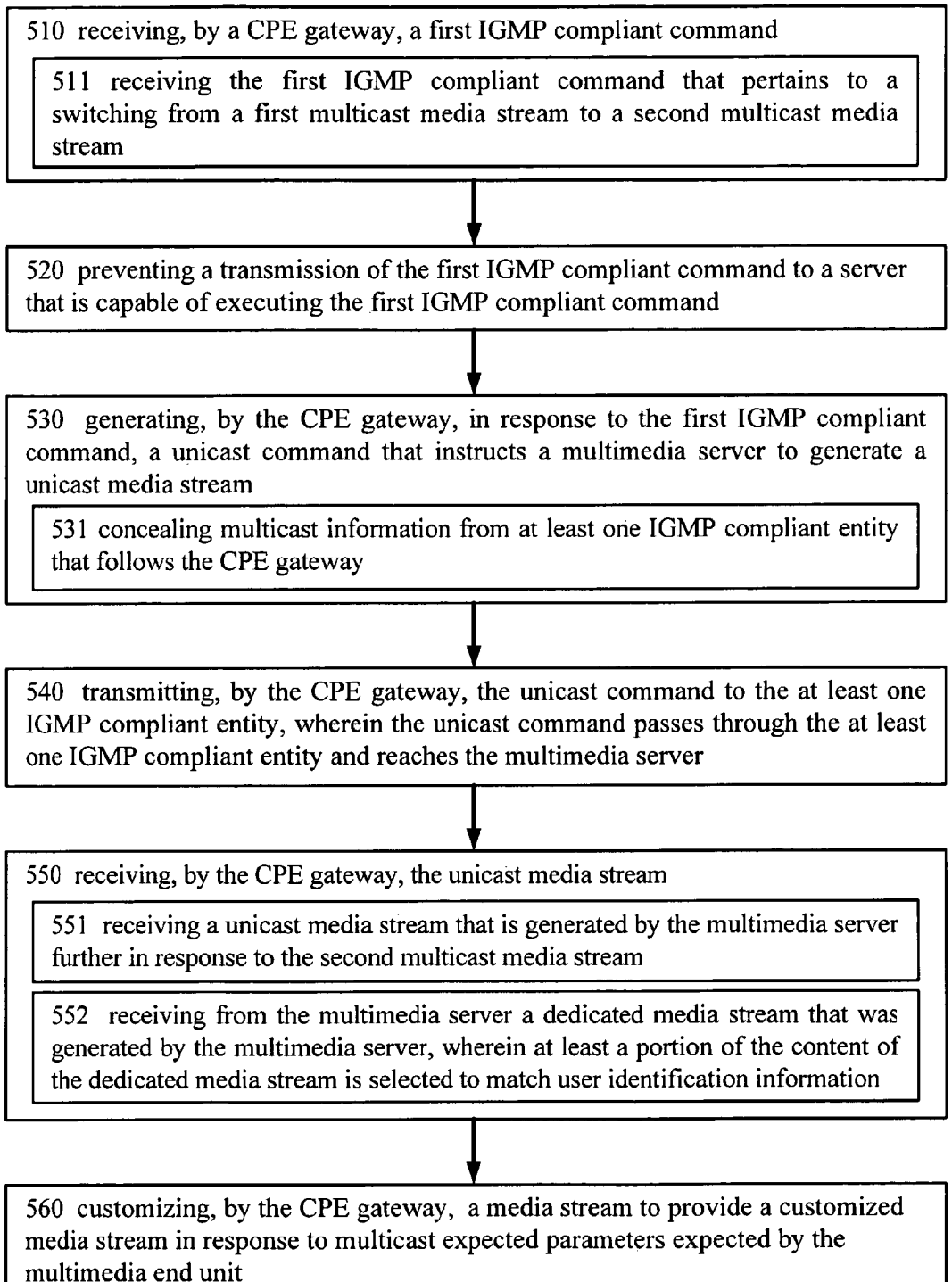
FIGS. 3A and 3B illustrate a method for an operation of a customer-premises equipment gateway, according to an embodiment of the invention.
Figure 3B:
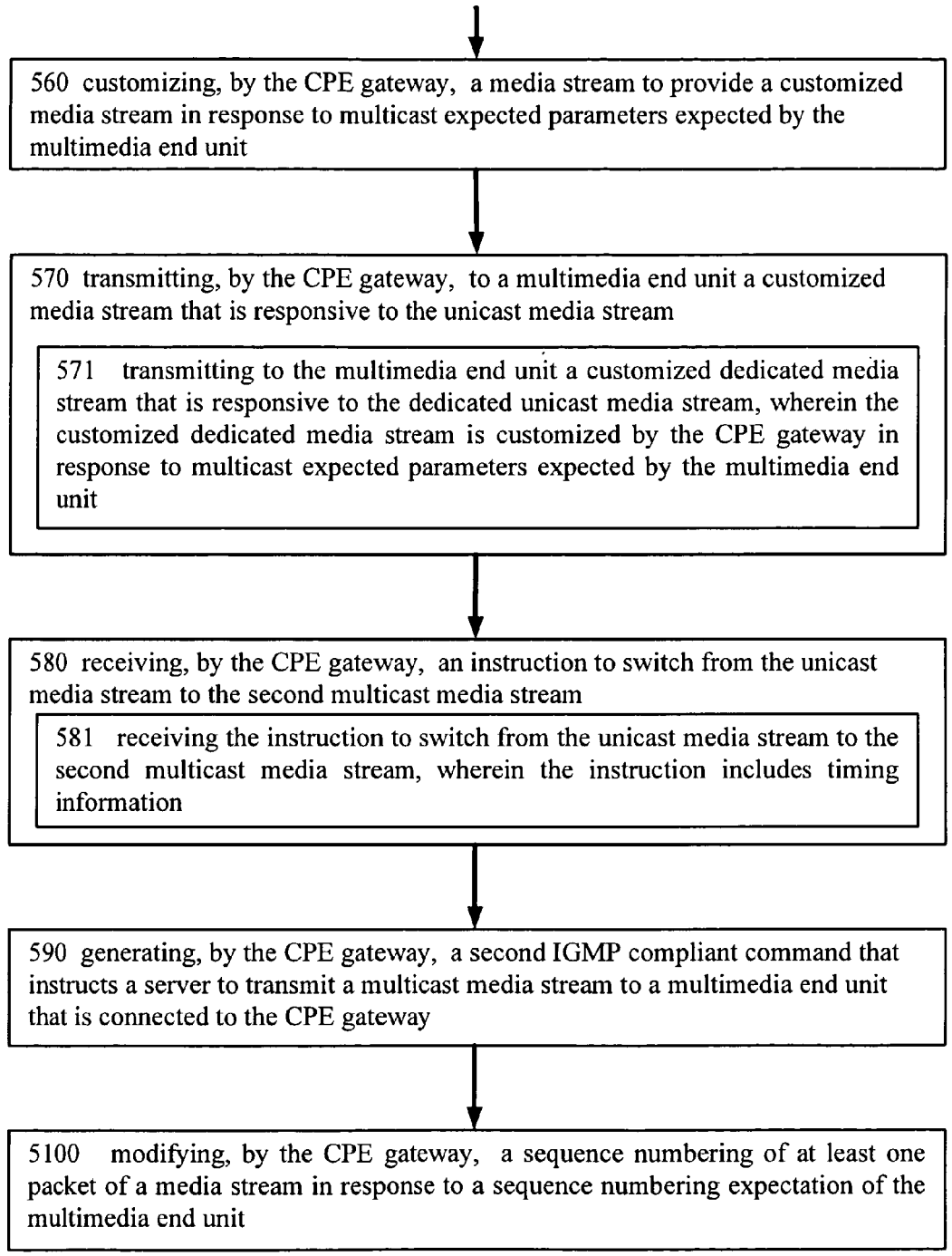

It should be noted that in many implementations of the invention, though not necessarily and without intending to limit the scope of the invention in any way, multicast commands don't necessarily propagate all the way from the CPE RG to the Server 60. For example, If a DSLAM is already receiving a media stream (e.g. CNN), and a subscriber CPE-RG issues a join into CNN, it is usually not necessary for the IGMP message to go all the way to the server. Conveniently, the DSLAM will act upon the IGMP message and replicate that media stream (e.g. CNN) to that subscriber FIGS. 3A and 3B illustrate method 500 for an operation of a customer-premises equipment gateway, according to an embodiment of the invention (wherein FIG. 3B illustrates a part of method 500 which follows, according to an embodiment of the invention, the part of method 500 illustrated in FIG. 3A), and FIG. 4 illustrates method 600 for generating a media stream, according to an embodiment of the invention. Referring to the examples set forward in the previous drawings, method 500 is conveniently carried out by CPE gateway 300, and method 600 is conveniently carried out by multimedia server 200, even though this is not necessarily so. A person of skill in the art would find that methods 500 and 600 may be carried out substantially in parallel, completing each other, even in situations where not explicitly so detailed. It is noted that, according to an embodiment of the invention, all the stages of method 500 are carried out by a single CPE gateway.

Referring now to method 500, method 500 starts with stage 510 of receiving, by the CPE gateway, a first internet group management protocol (IGMP) compliant command. It is noted that in most instances of stage 510, the first IGMP compliant command is received from a multimedia end unit to which the CPE gateway is connected. Two such first IGMP compliant commands that may be received are to join a multicast group (e.g. so as to receive a TV channel), and to leave a multicast group (e.g. ceasing to receive a currently viewed TV channel). It is however noted that other first IGMP compliant commands may be received, either from such a multimedia end unit, or from another system (such as server 60). Furthermore, it is noted that the CPE gateway may receive other types of command, and execute them, communicate them further, or otherwise handle such commands, without limiting the herein disclosed method 500.

Similarly, switching from broadcast programs to VOD would usually involve an IGMP leave operation only, and switching back from VOD to broadcast program would usually require a IGMP join action only.

According to an embodiment of the invention, stage 510 includes stage 511 of receiving the first IGMP compliant command that pertains to a switching from a first multicast media stream (e.g. BBC) to a second multicast media stream (e.g. CNN). Such a first IGMP compliant command may pertain to a zapping between TV channels (in the above example from BBC to CNN), etc. It is further noted that switching from a first multicast media stream to a second multicast media stream usually includes at least two IGMP compliant commands—(a) leaving a first multicast group that is associated with the first multicast media stream; and (b) joining a second multicast group that is associated with the second multicast media stream, but this is not necessarily so.

Later in method 500, the received first IGMP compliant command will be processed into a second-protocol command (e.g. a unicast command) that is addressed to a multimedia server, and thus the first IGMP compliant command should usually not reach a server that would execute it upon receiving (such as server 60, wherein it is noted that, according to an embodiment of the invention, all the references to server 60 may refer to server capabilities, functionalities, and/or components that are incorporated into the multimedia server, e.g. as illustrated in FIG. 2B).

Therefore, according to an embodiment of the invention, stage 510 is followed by stage 520 of preventing a transmission of the first IGMP compliant command to a server that is capable of executing the first IGMP compliant command (this preventing may also be referred to as terminating). It is noted that even though the transmission of the first IGMP command may be prevented by the CPE gateway, in some situations the first IGMP compliant command may be terminated further up the route (e.g. in a DSLAM or in an EAS/router), for example in cases where the associated multicast address is already used. Thus, according to an embodiment of the invention, stage 520 may be preceded by determining whether to prevent the transmission of the first IGMP compliant command to the server which is capable of executing the first IGMP compliant command, and stage 520 may be replaced by informing a network component up the route (e.g. DSLAM, EAS/router) that the first IGMP compliant command should be terminated.

It is noted that IGMP compliant commands that are received from the STB usually involve a leave and join (though not always). It should therefore be noted that, according to an embodiment of the invention, the join IGMP compliant command is usually the one being blocked/terminated. For example, if there is an existing multicast stream coming from the network (from the DSLAM) to the CPE gateway, the IGMP leave will usually need to be sent to the DSLAM to get the stream to stop, and therefore that IGMP command will usually be passed through. Conveniently, part of the unicast control process implemented includes verifying that the previous multicast stream (ie, the one being left) has stopped before a unicast stream (or new multicast stream) is being sent, so as to prevent or limit a bandwidth demand overlap between the streams.

It should further be noted that while many examples of implementations of the invention herein disclosed refer to systems which implement DSLAM and other components as discussed for example in relation to FIGS. 2A through 2C, the invention could be also implemented in different kinds of IPTV systems, and especially in Fiber To The Premises systems (such as FTTH systems). For example, the IGMP compliant entity may be a DSLAM, but may also be a component of a passive optical network (PON) such as an OLT (optical line termination), or a wireless radio access network (RAN) element, as well as other implementations.

Method 500 continues with stage 530 of generating, by the CPE gateway, in response to the first IGMP compliant command, a unicast command (that conveniently includes unicast request information) that instructs a multimedia server to generate a unicast media stream. Referring to the implementation just offered, the unicast request information, if so implemented, enables a multimedia server (such as multimedia server 200) to generate a unicast media stream that is responsive to the unicast request information.

It is noted that the generating conveniently includes stage 531 of concealing multicast information from at least one IGMP compliant entity that follows the CPE gateway (it is further noted that the preventing of stage 520 may follow the concealing, according to an embodiment of the invention). The at least IGMP compliant entity may be, according to some of the embodiments of the invention, the multimedia server, the DSLAM, and/or the router/EAS.

For example, the unicast command may indicate the second multicast media stream which was requested in a received "join" first IGMP compliant command. The unicast command (e.g. the unicast request information) usually also includes identification information, whether of the requesting multimedia end-unit, of the CPE gateway, or of the requested multicast. It is further noted that such a unicast command may further include (or alternatively, in another command), according to an embodiment of the invention, a request for initiation of a session between the multimedia server and the CPE gateway. Alternatively, additional content may be transmitted in a current session.

The unicast command is usually a second-protocol compliant command, wherein it is noted that the second protocol is not an IGMP protocol. As disclosed above, according to an embodiment of the invention, the second protocol may be a VSP protocol, which may be based on the real time streaming protocol (RTSP), but with additional commands. It is noted that the second-protocol may not govern the actual transmission of media streams, but may pertain only to application layer commands. It is noted that the VSP protocol is based, according to an embodiment of the invention, on TCP or some reliable UDP.

Accordingly, according to an embodiment of the invention, the unicast command may addressed (and/or include the address) of a port number and of VSP termination point of the multimedia server.

Stage 530 is followed by stage 540 of transmitting, by the CPE gateway, the unicast command to the at least one IGMP compliant entity, wherein the unicast command passes through the at least one IGMP compliant entity and reaches the multimedia server. It is noted that while the IGMP compliant entity (such as the DSLAM or the network router) might have taken action in response to the first IGMP compliant command (that was concealed from the IGMP compliant entity), it is usually not configured to take any action in response to the unicast command (or to any other second-protocol compliant command) except of transmitting the unicast command toward the multimedia server.

Following stage 540, the multimedia server is expected to execute the unicast command and the CPE gateway may expect a media stream. The generation of a media stream is referred to in stage 630 of method 600.

According to an embodiment of the invention, method 500 continues with stage 550 of receiving, by the CPE gateway, the unicast media stream (which is usually responsive to the unicast request information, if the unicast request was so implemented). As will be discussed later, providing of media streams (whether unicast or multicast) from the multimedia server to the CPE gateway may be initiated not only by the CPE gateway (e.g. in response to the first IGMP compliant command), as discussed in relation to the stages ab hinc, but may also be initiated by the multimedia server itself (which may respond to information received from another server, such as server 60, which may be included in received multicast media streams).

If a second media stream (e.g. CNN) was requested in the first IGMP compliant command, it may not be provided directly to the multimedia end-unit instantly, without evident delay (mainly due to inter-frame dependency in media streams such as in MPEG). However, as the multimedia server continually receives the second media stream (according to such an embodiment of the invention), it may generate a new unicast media stream in response to the second multicast media stream, which in turn may be provided to the multimedia end-unit, for instant zapping.

Thus, according to an embodiment of the invention, stage 550 includes stage 551 of receiving a unicast media stream that is generated by the multimedia server further in response to the second multicast media stream (and usually also to the unicast request information, if implemented).

It is noted that, according to another embodiment of the invention, the original request was not to switch to the second multicast media stream, but rather to receive additional information that is incorporated into a currently received multicast media stream (e.g. into the BBC stream). According to such an embodiment of the invention, stage 550 may include receiving a unicast media stream that is generated by the multimedia server in response to the unicast request information and to a multicast media stream currently received by the CPE gateway. For example, the server may incorporate a pop-up window including information requested by a user of the multimedia end-unit etc. it is noted that such a media stream may be also initiated by the multimedia server, and not only in response to second-protocol commands (e.g. an advertisement covering a portion of the screen).

Method 500 may also include providing of user-addressable advertisements. For example, during a commercial break of a TV channel, different users may be provided with advertisement content that is individually selected in response to different parameters. In such a case the first IGMP compliant command may be received from the multimedia server, instructing the CPE gateway that a switch to a substitute media stream is due (either unicast or multicast), usually few seconds (e.g. 4-6) before a beginning of the addressable advertising slot. The substitute media stream may start with few seconds of content received from the currently viewed multicasted media stream (e.g. BBC), followed by advertisement. Usually, the substitute media stream would be a unicast media stream if the advertisement is selected for viewing to a limited amount of subscribers, and a multicast media stream if the number of addressees to the advertisement is higher that a threshold value.

According to an embodiment of the invention, stage 550 includes stage 552 of receiving from the multimedia server a dedicated media stream (which may be either unicast or multicast, as explained above) that was generated by the multimedia server, wherein at least a portion of the content of the dedicated media stream is selected to match user identification information (which may pertain to the CPE gateway, to the multimedia end-unit, to the subscriber, or to a current viewer).

According to an embodiment of the invention, method 500 continues with stage 560 of customizing, by the CPE gateway, a media stream to provide a customized media stream in response to multicast expected parameters expected by the multimedia end unit. That is, as the entire process of method 500 is conveniently transparent to the multimedia end-unit, the multimedia end-unit still expects to receive a multicasted media stream (e.g. BBC or CNN). Thus, it is up to the CPE gateway, according to an embodiment of the invention, to provide the multimedia end-unit with a multicast media stream which matches certain parameters expected by the multimedia end unit. This may include, for example, format of the customized media stream, identification information of the customized media stream (or of portions thereof, such as packets thereof), bit rate of the customized media stream, and so forth. According to an embodiment of the invention, the customization of the media stream may include changing one or more information fields selected from an destination IP address, destination port information, source IP address, source port information, and/or RTP sequence number. It is however noted that other information fields may be changed, added, or removed, in other embodiments of the invention.

It is noted that, according to an embodiment of the invention, stage 560 may include customizing the received unicast media stream by modifying portions thereof (e.g. target address, packet numbering, and so forth), and may alternatively include generating (and customizing) the customized media stream in response to the received unicast media stream.

It is further noted that, according to an embodiment of the invention, method 500 may further include of customizing received multicast media streams (e.g. multicasted media streams of addressable advertisements) to match multicast expected parameters which are expected by the multimedia end unit.

Method 500 continues with stage 570 of transmitting, by the CPE gateway, to the multimedia end unit the customized media stream that is responsive to the unicast media stream (or, continuing the alternative discussed above, responsive to a multicast media stream received from the multimedia server).

It is noted that, according to an embodiment of the invention in which stage 552 is carried out, stage 570 may include stage 571 of transmitting to the multimedia end unit a customized dedicated media stream that is responsive to the dedicated unicast media stream, wherein the customized dedicated media stream is customized by the CPE gateway in response to multicast expected parameters expected by the multimedia end unit.

As aforementioned, according to an embodiment of the invention, method 500 may be implemented for switching between two multicast media streams, in order to facilitate smooth zapping, for instance. However, at some point (usually few seconds after the zapping), the multimedia server may determine that the CPE gateway may now switch to the aforementioned second multicast media stream (e.g. CNN), for example if a new I-frame of a MPEG video stream is being transmitted. The determining by the multimedia server is conveniently responsive to contents of the second multicast media stream received from the server.

Therefore, according to an embodiment of the invention, method 500 includes stage 580 of receiving (usually from the multimedia server) an instruction to switch from the unicast media stream to the second multicast media stream.

It is noted that, according to an embodiment of the invention, stage 580 includes stage 581 of receiving the instruction to switch from the unicast media stream to the second multicast media stream, wherein the instruction includes timing information, which is generated by the multimedia server (e.g. switch within Y seconds, X milliseconds, etc.).

Method 500 is thus usually continued with stage 590 of 590 generating, by the CPE gateway, a second IGMP compliant command that instructs a server (such as server 60) to transmit a multicast media stream (usually the second multicast media stream) to a multimedia end unit that is connected to the CPE gateway. It is noted that, according to an embodiment of the invention, the second IGMP compliant command includes multicast request information that facilitates a transmission of the multicast media stream from the server to the multimedia end unit.

It is noted that in the second IGMP compliant command may be regarded in some situations as a retransmission of the terminated first IGMP compliant command (mutatis mutandis), e.g. for requesting the second multicast media stream (e.g. CNN) from the server, though at a correct time, and following an intermediate period in which substitutionary media stream was provided by the multimedia server.

According to an embodiment of the invention, method 500 further includes stage 5100 of modifying, by the CPE gateway, a sequence numbering of at least one packet of a media stream in response to a sequence numbering expectation of the multimedia end unit.

The CPE gateway (and especially the VSP client, if implemented) is expected to re stamp outgoing RTP encapsulated video flows with an increasing sequence numbers in a way that each multimedia end unit (such as STB) on the LAN will get a standard sequential RTP flows with no discontinuities. Therefore, the CPE gateway is required to identify different video flows (e.g. on different STBs within the same house hold or different flows with in the same STB) and maintain unique sequence number per flow. Discontinuity of RTP sequence numbers are expected to occur in two different scenarios. The first is as a consequence of a VSP control command (e.g. REDIRECT, PLAY_RES) and the second is upon in band (with in the RTP flow) notification. The following cases summarizes the RTP discontinuities cases, according to an embodiment of the invention:

a. Channel change; first packet after the PLAY_RES VSP message in unicast/multicast on the new program, and/or transition from unicast to multicast on the same program (ICC use case) after REDIRECT operation
b. Splicing; transition (via REDIRECT) from multicast to unicast or other multicast just before the ad break starts, and/or transition (via REDIRECT) from unicast or multicast to other multicast upon ad break termination.
c. In-band notification (generated by the multimedia server); the multimedia server can decide to introduce a "jump" in the RTP sequence numbers of a certain flow. This "jump" should be notified beforehand by a predecessor RTP packet that specifies the next expected sequence number of that specific flow.
d. Network issues; (a) Reorder of packet arrival time— Packets may come in different order due to different routes (note: the probability for that is quiet low, yet the CPE gateway should be robust enough to handle it). Therefore, as part of the packet loss identification function, which requires tracking the last 100-200 window msec received packets, the VSP client should have the ability to identify arrival of new packets before old packets. The CPE gateway is not required to reorder the packets. STBs should have the ability to handle it. (b) packet lost—If none of the above happened then the RTP discontinuity will be treated as one that is due to packet loss which requires retransmission handling.

Figure 4A:
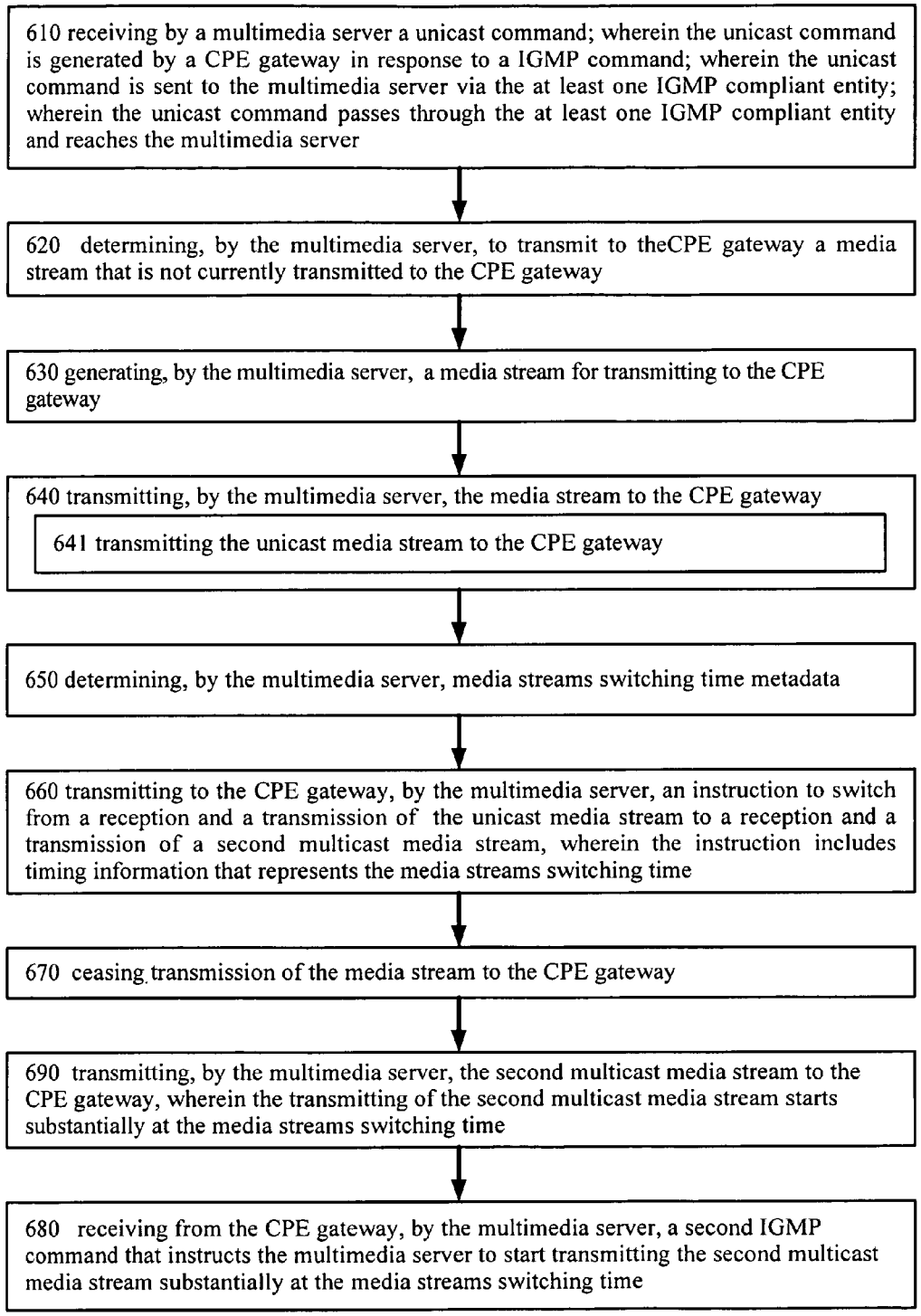

FIGS. 4A and 4B illustrates method 600 for generating a media stream, according to an embodiment of the invention, wherein FIG. 4B illustrates in detail stages 610, 620, and 630 of method 600, according to different embodiments of the invention. It is noted that method 600 may be carried out, according to different embodiments of the invention, by a multimedia server dedicated for transmission of media streams that relatively short-termed, or by a multimedia server that is adapted for transmission of both such relatively short-termed media streams and of continuous transmission of media streams (such as standard TV channels, and possibly of VOD services, or other advanced services). It is noted that in the later case, two substantially distinct component may implement the two functionalities.

Method 600 includes transmitting a media stream from the multimedia server to a CPE gateway (which may be connected to at least one multimedia end unit such as a STB, or incorporated with which). This transmission may be initiated by the CPE gateway (e.g. following a reception of an IGMP compliant command from the multimedia end unit), or by the multimedia server (e.g. during an addressable advertisement session).

According to different embodiments of the invention, the providing of the media stream may be initiated by the CPE gateway, by the multimedia server itself, by a media providing source, and/or by other entity. Those different initiations (whichever is implemented) usually precede stage 620 of determining to transmit to the CPE a media stream that is not currently transmitted to the CPE gateway.

According to an embodiment of the invention, stage 620 (that will be discussed below in more detail) is preceded by stage 610 of receiving by a multimedia server a unicast command (which is, according to an embodiment of the invention, a second-protocol command as discussed above); wherein the unicast command is generated by a CPE gateway in response to a IGMP command; wherein the unicast command is sent to the multimedia server via the at least one IGMP compliant entity; wherein the unicast command passes through the at least one IGMP compliant entity and reaches the multimedia server.

It is noted that the second protocol command usually requests the multimedia server to provide to the CPE gateway a media stream, as will be discussed below. As discussed above, in relation to method 500, the second-protocol is a protocol other than the IGMP protocol. According to an embodiment of the invention, the second protocol may be a VSP protocol, which may be based on the real time streaming protocol (RTSP), but with additional commands. It is noted that the second-protocol may not govern the actual transmission of media streams, but may pertain only to application layer commands. It is noted that the VSP protocol is based, according to an embodiment of the invention, on TCP or some reliable UDP.

According to an embodiment of the invention, stage 610 includes stage 611 of receiving a unicast command that was generated by the CPE gateway in response to a first IGMP compliant command issued by a multimedia end-unit (see for example discussion relating to stage 530 of method 500).

According to an embodiment of the invention, stage 610 includes receiving from the CPE gateway a multimedia command that includes request information that will be later put to use during a generation of a media stream (see discussion relating to stage 630, and especially to stage 631). The request information received may be, according to an embodiment of the invention, a request information for a unicast media stream, a request information for a multicast media stream, and a general request information wherein the type of the media stream transmitted (i.e. unicast or multicast) is determined by the multimedia server.

According to an embodiment of the invention, stage 610 includes stage 612 of receiving a unicast command that includes unicast request information which facilitates generation of a unicast media stream responsive to the unicast request information.

According to an embodiment of the invention, stage 610 includes stage 613 of receiving a multicast command that includes multicast request information which facilitates a transmission of a multicast media stream responsive to the multicast request information.

It is noted that in an implementation of the invention, the receiving includes stage 614 of receiving a unicast command that pertains to a switching from a first multicast media stream to a second multicast media stream (e.g. to zapping between television channels, as exemplified above).

Whichever is the initiating entity, method 600 continues to stage 620 of determining, by the multimedia server, to transmit to a CPE gateway a media stream that is not currently transmitted to the CPE gateway. Examples of media streams that may be transmitted to the CPE gateway but which are not currently transmitted to it are (a) media streams that are generated in response to a media stream that is requested by the multimedia end-unit (e.g. a second TV channel requested when zapping from a currently viewed TV channel to another), and (b) media streams that include dedicated content (like in addressable advertising), which may be selected for transmission during an advertising break.

According to an embodiment of the invention, stage 620 includes stage 621 of determining to transmit to the CPE gateway a unicast media stream.

According to an embodiment of the invention, in which stage 610 was carried out, stage 620 may include stage 622 of determining to transmit the media stream in response to the unicast command (or alternatively to a second-protocol command other than a unicast command).

According to an embodiment of the invention, stage 620 may include stage 623 of determining to transmit to the CPE gateway a dedicated media stream (such as an addressable advertisement).

According to an embodiment of the invention, stage 620 includes stage 624 of determining to transmit the media stream that is not currently transmitted to the CPE gateway in response to content of a media stream that is currently transmitted to the CPE gateway. That is, the media stream that is currently transmitted to the CPE gateway (e.g. TV channel viewed by a subscriber) may include an indicator for a beginning of a commercials break, and so forth. Furthermore, an analysis of the content of the media stream that is currently transmitted to the CPE gateway may be carried out, in order to carry out the determining on the base of analyzed content (e.g. analyzed video content).

Method 600 continues with stage 630 of generating, by the multimedia server, a media stream for transmitting to the CPE gateway. It is noted that the generating may include generating new content for the media stream, changing an existing content, and leaving a content of an existing media stream substantially intact, while inserting a target address for the CPE gateway (and/or for the multimedia end-unit). Many a time the generating may include re-packeting of a received media stream so as to match expectations of the CPE gateway.

According to an embodiment of the invention, stage 630 includes generating a unicast media stream (denoted 631).

According to an embodiment of the invention, the generating includes stage 632 of generating the media stream in response to request information included in the unicast command (or alternatively to a second-protocol command other than a unicast command).

According to an embodiment of the invention, stage 630 includes stage 633 of generating the media stream in response to a second media stream that is received from a media source (which may and may not be a part of the server, and alternatively may and may connected to the server via a network). For example, as discussed above in relation to method 500, if the second-protocol command pertained to a switching by the CPE gateway from receiving a first media stream (e.g. BBC) to receiving the second media stream (e.g. CNN), then stage 633 may include providing to the CPE gateway a version of the second media stream that is viewable (e.g. generating a new I-frame for an MPEG second media stream).

According to an embodiment of the invention, stage 630 includes stage 634 of generating a dedicated media stream, wherein at least a portion of the content of the dedicated media stream is selected to match user identification information (which may pertain to the CPE gateway, to the multimedia end-unit, to the subscriber, or to a current viewer). Stage 634 may be carried out, for example, in a scenario of providing addressable advertisements.

Stage 630 is followed by stage 640 (which may be, according to an embodiment of the invention, partially concurrent to stage 630) of transmitting, by the multimedia server, the media stream to the CPE gateway. It is noted that the transmitted media stream is usually of a limited duration (e.g. few seconds to few minute), such when the transmitted media stream is an addressable advertisement (or few consecutive addressable advertisements), or a media stream replacing the second media stream of a TV channel zapped to, until the main multicast media stream of that channel may be provided to the subscriber by the server.

As the streaming of multimedia content to the multimedia end-unit connected to the CPE gateway needs in general to be continuous, the CPE gateway needs to make itself ready for reception of another media stream once a transmission of the media stream of stage 640 is ceased. In order to do so, a proper notice should usually be provided to the CPE gateway by the multimedia server.

According to an embodiment of the invention, stage 640 includes transmitting the unicast media stream to the CPE gateway (denoted 641).

Stage 640 is followed by stage 650 of determining, by the multimedia server, media streams switching time that corresponds to the media streams switching time metadata. Conveniently, the determining of the media streams switching time metadata may be preceded by determining a media streams switching time, to which the media streams switching time metadata corresponds. It is noted that naturally, the media streams switching time is later in time relative to the determining. It is noted that the determining may be responsive to a content of a second multicast media stream, to timing information received from a server (such as server 60), from a timing component of the multimedia server, and so forth, but this is not necessarily so.

It is further noted that, according to an embodiment of the invention, the multimedia server does not determine the exact media streams switching time, but rather a relatively narrow time-window, during which the CPE gateway is expected by the multimedia server to issue an IGMP command, such as an IGMP command for joining the multicast. According to an embodiment of the invention, the media streams switching time corresponds to such a time window.

It should be noted that according to another implementation, the CPE gateway may determine a switching time on its own (either in response to media streams switching time metadata received from the server, or otherwise). For examiner, the CPE gateway me determine a switching time based on sequence numbering.

Stage 650 is followed by stage 660 of transmitting to the CPE gateway, by the multimedia server, an instruction to switch from a reception and a transmission of the unicast media stream to a reception and a transmission of a second multicast media stream, wherein the instruction includes the media streams switching time metadata (which may, according to an embodiment of the invention, be a representation of the media streams switching time itself, or, according to an embodiment of the invention, of a time that is very close thereto, or to otherwise correspond to a media streams switching time).

For example, an advance warning time from the moment the instruction was transmitted until the media streams switching time may be about 4 to 6 seconds, which is sufficient, in some implementations of the invention, for the CPE gateway to request another media stream, to join a multicast group (e.g. using IGMP compliant commands) and so forth.

According to an embodiment of the invention, method 600 continues with stage 670 of ceasing transmission of the media stream to the CPE gateway. The ceasing usually corresponds to a length of the media stream, but this is not necessarily so (e.g. if a subscriber switched channel in the midst of an addressable advertisement).

As aforementioned, according to an embodiment of the invention, the multimedia server may be adapted to provided media streams in special occasions as in the former stages of method 600, while also being configured to continuously provide multicast media streams (e.g. of different TV channels) and/or other types of data channels. According to such an embodiment of the invention, stage 670 is followed by stage 690 of transmitting, by the multimedia server, the second multicast media stream to the CPE gateway, wherein the transmitting of the second multicast media stream starts substantially at the media streams switching time. It is noted that the transmission of the second multicast media stream to the CPE gateway may follow a reception of an IGMP compliant command (or other type of command), which in turn may be initiated by the instruction of stage 650.

Figure 5:
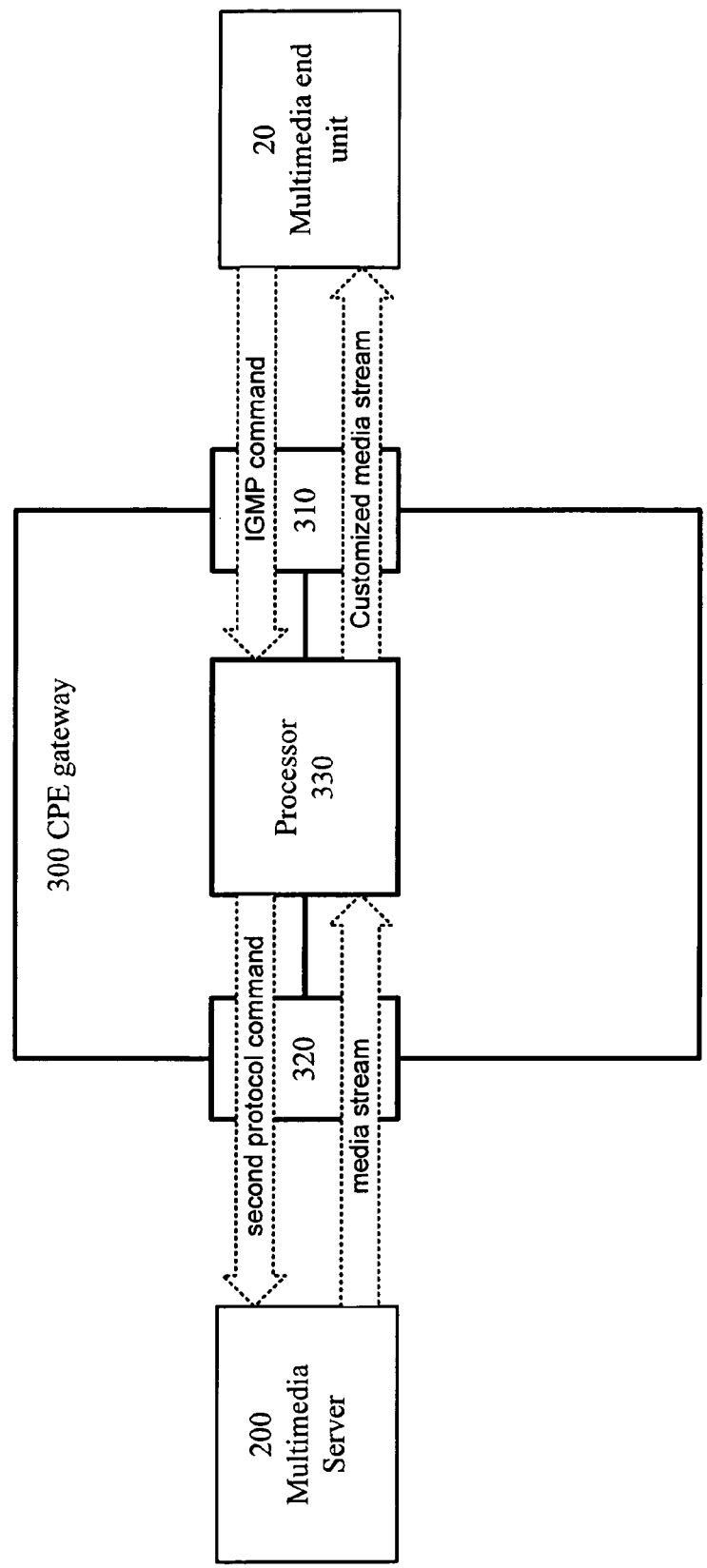
FIG. 5 illustrates a customer-premises equipment (CPE) gateway, according to an embodiment of the invention.
Figure 6:
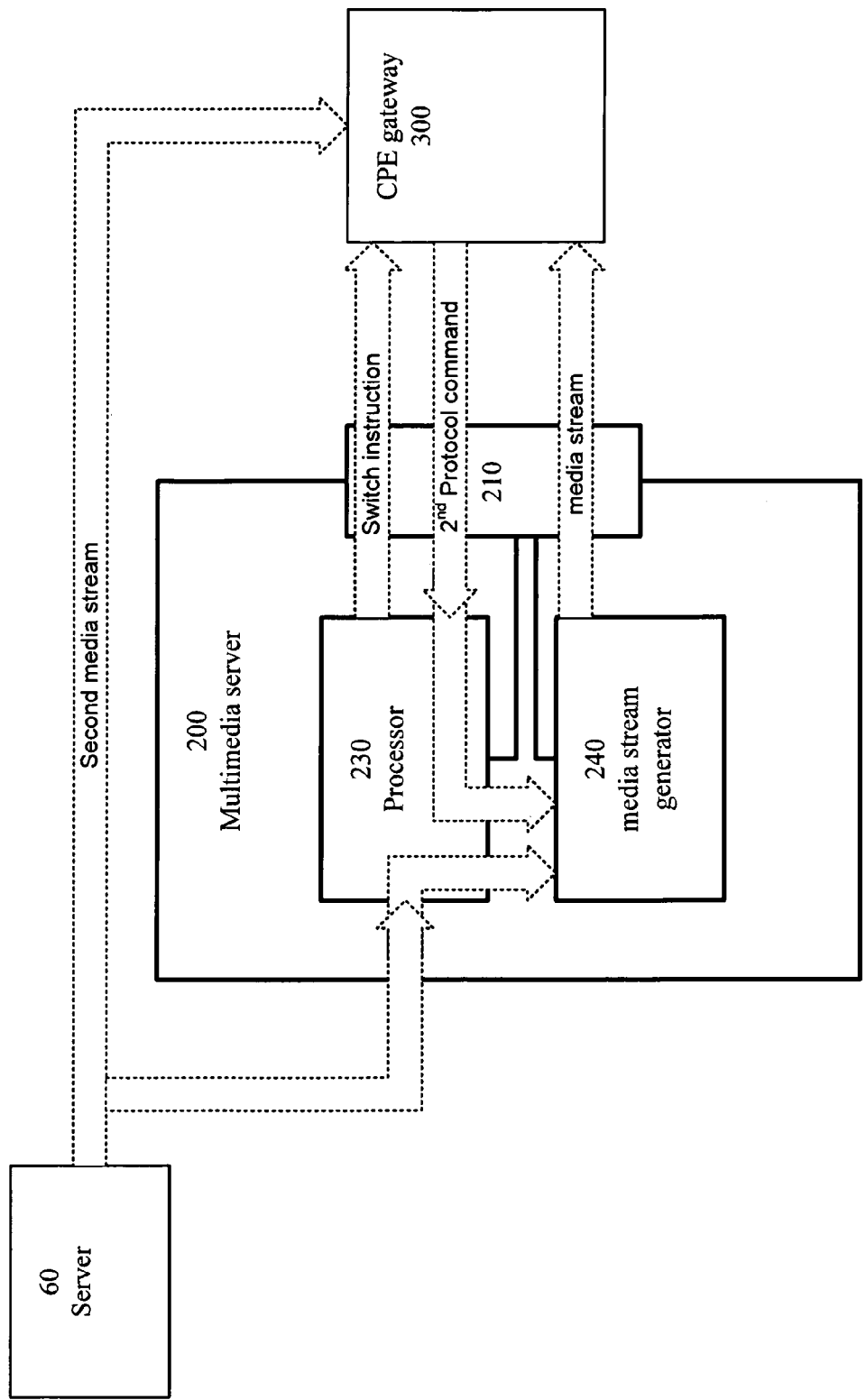
FIG. 6 illustrates a multimedia sever, according to an embodiment of the invention.

According to an embodiment of the invention, stage 690 is preceded by stage 680 of receiving from the CPE gateway, by the multimedia server, a second IGMP command that instructs the multimedia server to start transmitting the second multicast media stream substantially at the media streams switching time FIG. 5 illustrates a customer-premises equipment (CPE) gateway 300, according to an embodiment of the invention; and FIG. 6 illustrates a multimedia sever 200, according to an embodiment of the invention. It is noted that conveniently, CPE gateway 300 is adapted to carry out method 500, and multimedia server 200 is adapted to carry out method 600. Conveniently, CPE gateway 300 and multimedia server 200 are connected to each other (usually by a network which may include additional components, e.g. as illustrated in each of FIGS. 2A, 2B, and 2C), and are adapted to communicate to each other in order to cooperate in a transmission of a media stream from multimedia server 200 to CPE gateway 300.

Referring now to FIG. 5, CPE gateway 300 includes first interface 310 for receiving a first internet group management protocol (IGMP) compliant command (usually from a multimedia end-unit, but this is not necessarily so); processor 330 for generating, in response to the first IGMP command, a unicast command that instructs a multimedia server (e.g. multimedia server 200) to generate a unicast media stream; and for concealing multicast information from at least one IGMP compliant entity (e.g. DSLAM/Fiber Terminal unit 40 and/or Network Router 50 that follows the CPE gateway (it is noted that, according to an embodiment of the invention, the unicast command—which is conveniently a second-protocol command—includes unicast request information that enables the multimedia server to generate the unicast media stream that is responsive to the unicast request information); and second interface 320 for transmitting the unicast command to the at least one IGMP compliant entity; wherein the unicast command passes through the at least one IGMP compliant entity and reaches the multimedia server.

It is noted that CPE gateway 300 usually includes additional components required for an operation of the CPE gateway 300 and/or for other functionalities thereof (e.g. a power source, a user interface, and so forth), as will be clear to a person who is of skill in the art. It is further noted that the aforementioned components of CPE gateway 300 (as well as other components) may be implemented in a single component or in multiple components (e.g. a single processor or multiple processors), and that in an implementation of CPE gateway 300, a single component of the CPE gateway 300 may implement functionalities of two components of CPE gateway 300 as herein disclosed.

It is noted that according to different embodiments of CPE gateway 300, CPE gateway 300 may be configured to carry out some or all of the stages of method 500 and of the different embodiments thereof. Some of those implementations are discussed below, without any intention the ability of such different embodiments of CPE gateway 300 to carry out different embodiments of method 500 discussed above. According to an embodiment of the invention, CPE gateway 300 is further adapted to prevent the first IGMP compliant command from being transmitted to a server (e.g. server 60) that is capable of executing the first IGMP compliant command. It is noted that IGMP compliant commands that are received from the STB usually involve a leave and join (though not always). It should therefore be noted that, according to an embodiment of the invention, the join IGMP compliant command is usually the one being blocked/terminated. For example, if there is an existing multicast stream coming from the network (from the DSLAM) to the CPE gateway, the IGMP leave will usually need to be sent to the DSLAM to get the stream to stop, and therefore that IGMP command will usually be passed through. Conveniently, part of the unicast control process implemented includes verifying that the previous multicast stream (ie, the one being left) has stopped before a unicast stream (or new multicast stream) is being sent, so as to prevent or limit a bandwidth demand overlap between the streams.

According to an embodiment of the invention, second interface 320 is further for receiving the unicast media stream that is responsive to the unicast request information (or for receiving a multicast media stream responsive to a request information included in the second protocol command); and first interface 310 is further for transmitting to a multimedia end unit a customized media stream that is responsive to the unicast media stream; wherein the customized media stream is customized by CPE gateway 300 in response to multicast expected parameters expected by the multimedia end unit.

According to an embodiment of the invention, the first IGMP compliant command pertains to a switching from a first multicast media stream to a second multicast media stream.

According to an embodiment of the invention, second interface 320 is further for receiving: (a) a unicast media stream that is generated by the multimedia server in response to the unicast request information and to the second multicast media stream; and (b) an instruction to switch from the unicast media stream to the second multicast media stream, wherein, according to an embodiment of the invention, the instruction includes timing information.

According to an embodiment of the invention, processor 330 is further for generating a second IGMP compliant command that that instructs a server to transmit a multicast media stream to a multimedia end unit that is connected to the CPE gateway; according to an embodiment of the invention, the second IGMP compliant command includes multicast request information that facilitates a transmission of the multicast media stream from the server (not illustrated, e.g. server 60) to the multimedia end unit 20 that is connected to CPE gateway 300.

According to an embodiment of the invention, second interface 320 is further for receiving from the multimedia server a dedicated unicast media stream that is generated by the multimedia server in response to user identification information.

According to an embodiment of the invention, first interface 310 is further for transmitting to multimedia end unit 20 a customized dedicated media stream that is responsive to the dedicated unicast media stream.

According to an embodiment of the invention, the customized dedicated media stream is customized by CPE gateway 300 (e.g. by processor 330) in response to multicast expected parameters expected by the multimedia end unit 20.

According to an embodiment of the invention, CPE gateway 300 is further adapted to modify a sequence numbering of at least one packet of a media stream in response to a sequence numbering expectation of the multimedia end unit 20.

According to an embodiment of the invention, CPE gateway 300, and especially the VSP client—if so implemented—is built of two distinct layers (not illustrated). The first layer is a control oriented layer that deals with the second-protocol (e.g. VSP—Video edge STB Protocol) and therefore is a slow path function. The second layer is a data (video packets) oriented layer that manipulates each incoming packet according to some programmed rules.

Some of the control functions that may be implemented by CPE gateway 300, and especially the VSP client—if so implemented—are:

TCP/UDP session—CPE gateway 300 requires opening a control socket for the protocol transport. This may be done over TCP, and according to an embodiment of the invention, UDP based connection is required. CPE gateway 300 is responsible, according to an embodiment of the invention, for the initialization of communication. Further more, CPE gateway 300 is conveniently expected to sense communication problem and reopen the connection incase the connection drops. For that purpose, CPE gateway 300 is conveniently required to be provisioned with an IP and port number of multimedia server 200.

Handle VSP messages—CPE gateway 300 conveniently complies with the second protocol (e.g. the VSP protocol) and hence support all types of messages. For example, for the VSP protocol CPE gateway 300 may be required to support all of the following types of messages: OPTIONS, SETUP, SETUP_RES, TEARDWON, TEARDOWN_RES, PLAY, PLAY_RES, REDIRECT, REDIRECT_RES, RETRANSMIT, RETRANSMIT_RES. CPE gateway 300 should support the different type of messages by having the ability to issue and parse any second protocol command (e.g. VSP commands) according to the second-protocol.

IGMP compliant—According to different embodiments of the invention, CPE gateway 300 supports different versions of IGMP. According to an embodiment of the invention, CPE gateway 300, and especially the VSP client—if so implemented—is expected to IGMP v2/v3 compliant. This includes
 a. Trap "join" and "leave" request coming from the LAN (STB) side.
 b. Perform "join" and "leave" request on the WAN side when instructed by the second-protocol (e.g. REDIRECT, SETUP_RES)

IGMP to second-protocol translation—instead of proxying and generating IGMP requests coming from the LAN to the WAN side, CPE gateway 300 is conveniently configured to translate these traps to the following VSP messages (if so implemented):
 a. IGMP Leave is translated to TEARDOWN on the same multicast address that the leave is being requested (it is noted that, according to an embodiment of the invention, IGMP Leave is translated to TEARDOWN only if the incoming stream from the multimedia server (via the DSLAM) is unicasted. If it is multicasted, then an IGMP Leave may be sent to the DSLAM);
 b. IGMP Join is translated to SETUP on the same multicast address that the leave is being requested and PLAY upon receiving the SETUP_RES message.

Open a unicast session, CPE gateway 300, and especially the VSP client—if so implemented—is expected to prepare itself for getting video flows in unicast on a configured port number. Unicast is expected hit the client side on channel change event triggered by the SETUP_RES or splicing events via the REIDRECT command. a REDIRECT command can be issued for all the possible options:
 a. Multicast to unicast;
 b. Unicast to multicast;
 c. Unicast to unicast (different port);
 d. Multicast to multicast (different D class address).

Referring now to the data layer (if implemented) of CPE gateway 300, and especially of the VSP client—if so implemented—some of are functionalities of the data layer, according to an embodiment of the invention, are:

RTP sequence numbering—according to an embodiment of the invention, CPE gateway 300 is adapted to re-stamp outgoing RTP encapsulated video flows with an increasing sequence numbers in a way that each multimedia end unit on the LAN will get a standard sequential RTP flows with no discontinuities. Therefore, CPE gateway is required to identify different video flows (on different multimedia end units (e.g. STBs) within the same house hold—i.e. supported by the same CPE gateway 300 (or different flows with in the same multimedia end-unit) and maintain unique sequence number per flow. Discontinuity of RTP sequence numbers are expected to occur in two different scenarios. The first is as a consequence of a second-protocol control command (e.g. REDIRECT, PLAY_RES) and the second is upon an in-band (with in the RTP flow) notification. The following cases summarizes the RTP discontinuities cases, according to an embodiment of the invention:
 a. Channel change: (a) first packet after the PLAY_RES VSP message in unicast/multicast on the new program; (b) transition from unicast to multicast on the same program (ICC use case) after REDIRECT operation.
 b. Splicing: (a) transition (via REDIRECT) from multicast to unicast or other multicast just before the ad break starts; (b) transition (via REDIRECT) from unicast or multicast to other multicast upon ad break termination.
 c. In-band notification (generated by multimedia server 200): multimedia server 200 can decide to introduce a "jump" in the RTP sequence numbers of a certain flow. This "jump" should be notified beforehand by a predecessor RTP packet that specifies the next expected sequence number of that specific flow.
 d. Network issues: (a) reorder of packet arrival time—Packets may come in different order due to different routes (note: the probability for that is quiet low, yet CPE gateway 300 conveniently should be robust enough to handle it). Therefore, as part of the packet loss identification function, which requires tracking the last 100-200 window msec received packets, CPE gateway should have the ability to identify arrival of new packets before old packets. CPE gateway 300 is usually not required to reorder the packets, as the multimedia end-units 20 should have the ability to handle it; (b) packet lost—If none of the above happened then the RTP discontinuity will be treated as one that is due to packet loss which requires retransmission handling.
 e. Unicast to multicast translation—multimedia server 200 uses, according to some embodiments of the invention, unicast for doing RapidZap and addressable advertising. In order to keep the at least one multimedia end unit 20 (e.g. STB) ignorant, CPE gateway 300, and especially the VSP client—if so implemented—is conveniently configured to re-stamp the destination IP and port of each packet to the expected multicast that the multimedia end unit 20 think it is tuned to.
 f. Multicast to multicast translation—There are cases where multimedia server 200 will switch the flow from one multicast to another one. In order to keep the at least one multimedia end unit 20 (e.g. STB) ignorant (just like the unicast to multicast function), CPE gateway 300, and especially the VSP client—if so implemented—is conveniently configured to re-stamp the destination IP and port of each packet to the expected multicast that the multimedia end unit 20 think it is tuned to.

According to different embodiments of the invention, CPE gateway may be adapted to carry out one or more of the following actions:

a. Trap IGMP "join" messages from at least one multimedia end-unit. Instead of proxying and generating IGMP messages to WAN, generate unicast VSP messages to communicate with a multimedia server in the WAN. It is noted that according to some embodiments of the invention, the VSP messages may be implemented over either TCP or UDP.

b. Generate IGMP messages to WAN when instructed by the multimedia server via the unicast TCP second-protocol control messages. It is noted that according to some embodiments of the invention, the VSP messages may be implemented over either TCP or UDP.

c. Receive multicast data packets from WAN on group D1 with an RTP encapsulation. Transmit same packets on LAN as group D1, with a different RTP sequence number (mapping will be provided via second-protocol as to how to choose correct sequence number).

d. Receive unicast UDP video-stream packets from WAN with an RTP encapsulation. Transmit same packets on LAN with multicast header. Multicast group address and RTP sequence numbers to use on LAN will be provided by second-protocol.

e. Receive multicast data packets from WAN on group D1 with an RTP encapsulation. Transmit same packets on LAN as group D2—no change to RTP sequence number.

f. Observe RTP sequence numbers on multicast packets received from WAN. Generate unicast TCP second-protocol control message to multimedia server in reaction to a missing sequence number. It is noted that according to some embodiments of the invention, the VSP messages may be implemented over either TCP or UDP.

Referring now to FIG. 6, multimedia server 200 includes media stream generator 240 for generating a media stream (such as a unicast media stream) to be transmitted to a customer-premises equipment (CPE) gateway (e.g. CPE gateway 300); first server interface 210 for: receiving from the CPE gateway a unicast command; wherein the unicast command is generated by the CPE gateway in response to an internet group management protocol (IGMP) command; wherein the unicast command is sent to the multimedia server via the at least one IGMP compliant entity; wherein the unicast command passes through the at least one IGMP compliant entity and reaches the multimedia server; and for transmitting the unicast media stream to the CPE gateway; and processor 230 for determining media streams switching time metadata (which conveniently corresponds to a media streams switching time, which may also be determined by processor 230); wherein first server interface 210 is further for: transmitting to the CPE gateway an instruction to switch from a reception and a transmission of the unicast media stream to a reception and a transmission of a second multicast media stream, wherein the instruction includes the media streams switching time metadata; and for transmitting the second multicast media stream to the CPE gateway, wherein the transmitting of the second multicast media stream starts substantially at a media streams switching time that corresponds to the media streams switching time metadata.

It is further noted that, according to an embodiment of the invention, processor 220 does not determine the exact media streams switching time, but rather a relatively narrow time-window, during which the CPE gateway is expected by processor 220 to issue an IGMP command, such as an IGMP command for joining the multicast. According to an embodiment of the invention, the media streams switching time corresponds to such a time window.

It should be noted that according to another implementation, the CPE gateway may determine a switching time on its own (either in response to media streams switching time metadata received from the server, or otherwise). For examiner, the CPE gateway me determine a switching time based on sequence numbering.

It is noted that multimedia server 200 usually includes additional components required for an operation of the multimedia server 200 and/or for other functionalities thereof (e.g. a power source, a user interface, and so forth), as will be clear to a person who is of skill in the art. It is further noted that the aforementioned components of multimedia server 200 (as well as other components) may be implemented in a single component or in multiple components (e.g. a single processor or multiple processors), and that in an implementation of multimedia server 200, a single component of the multimedia server 200 may implement functionalities of two components of multimedia server 200 as herein disclosed.

It is noted that according to different embodiments of multimedia server 200, multimedia server 200 may be configured to carry out some or all of the stages of method 600 and of the different embodiments thereof. Some of those implementations are discussed below, without any intention the ability of such different embodiments of multimedia server 200 to carry out different embodiments of method 600 discussed above.

According to an embodiment of the invention, first server interface 210 is further for receiving from CPE gateway 300 a unicast command that instructs multimedia server 200 to generate the unicast media stream.

According to an embodiment of the invention, processor 230 is further configured to determine, prior to the generating of the unicast media stream, to transmit to CPE gateway 300 the unicast media stream in response content of a media stream that is currently transmitted to CPE gateway 300.

According to an embodiment of the invention, media stream generator 240 is further for generating a dedicated media stream, wherein at least a portion of the content of the dedicated media stream is selected to match user identification information.

According to an embodiment of the invention, first server interface 210 is further for receiving from CPE gateway 300, prior to the transmitting of the second multicast media stream, a second IGMP command that instructs multimedia server 200 to start transmitting the second multicast media stream substantially at the media streams switching time.

According to an embodiment of the invention, multimedia server 200 is configured to cease a transmission of the unicast media stream to CPE gateway 300.

Figure 7:
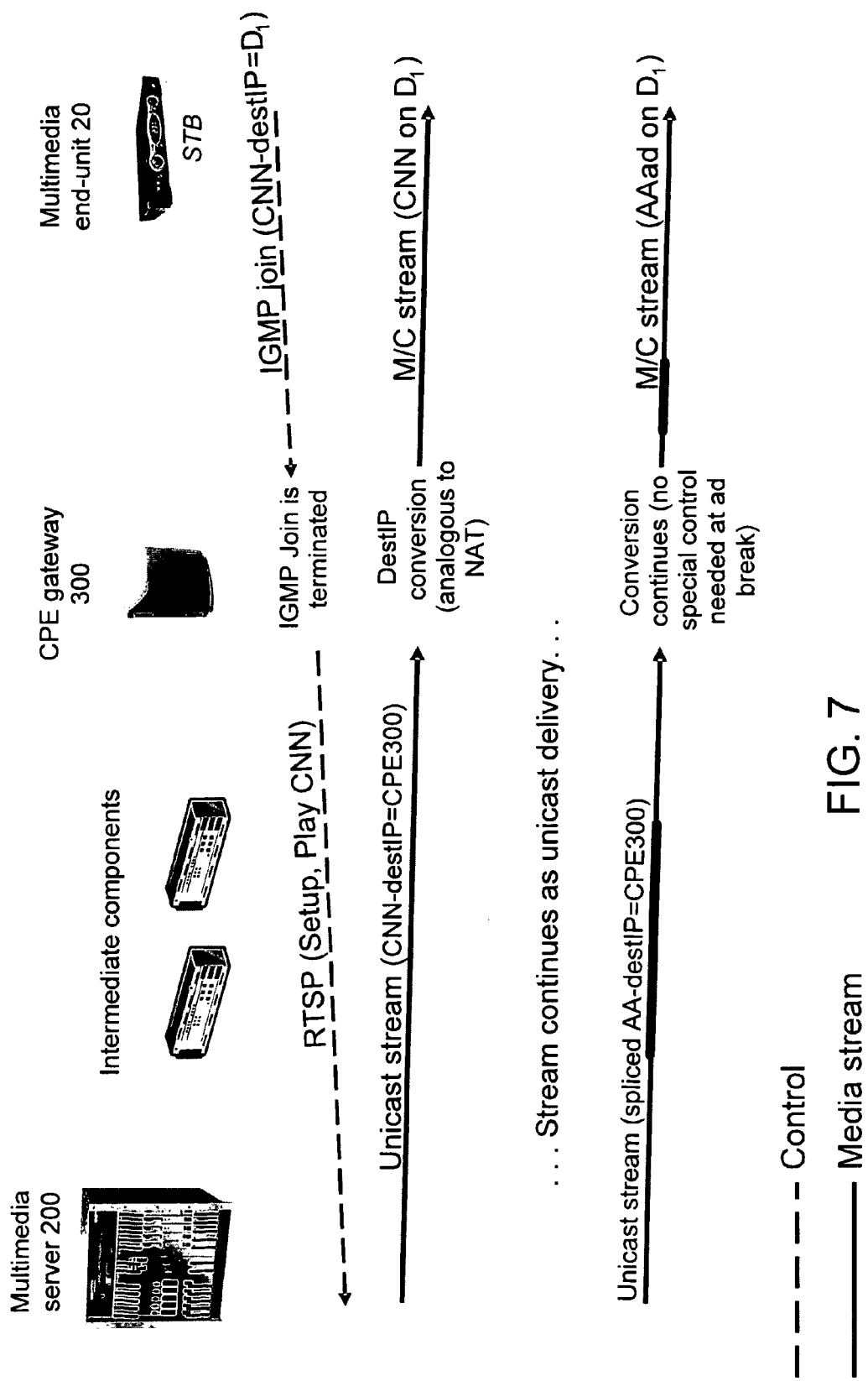
FIG. 7 illustrates multimedia transmission, according to an embodiment of the invention.

FIG. 7 illustrates multimedia transmission, according to an embodiment of the invention. The transmission scenario illustrated may occur, for example, when zapping from a first TV channel (e.g. BBC, not illustrated) to a second TV channel (in this case CNN), which is followed by a unicast addressable advertisement stream (which is the aforementioned dedicated media stream). The first IGMP compliant command in the illustrated scenario is an IGMP join command indicating the desired multicast group (e.g. CNN channel), and the destination address of multimedia end-unit 20 (denoted $D_1$).

CPE gateway 300 terminates the first IGMP join command, and generates a unicast command (in this case two unicast commands are generated, RTSP setup command, and RTSP play command, indicating the CNN channel). The one or more unicast commands are transmitted to multimedia server 200, which in response generates a unicast media stream that includes a content of the CNN channel, and which is transmitted in unicast to CPE gateway 300.

CPE gateway 300 processes the received media stream (customizes it), in this scenario by conversion of the address, and transmits it as it was a multicast media stream on the address provided by the multimedia end-unit 20, which is led to believe it receives a multicast media stream as expected.

In this scenario, multimedia server 200 is further adapted to incorporate an addressable advertisement (denoted AA) into the unicast media stream, which is converted by CPE gateway 300, as with the rest of the unicast media stream, to a multicast media stream that is provided to multimedia end-unit 20.

Figure 8:
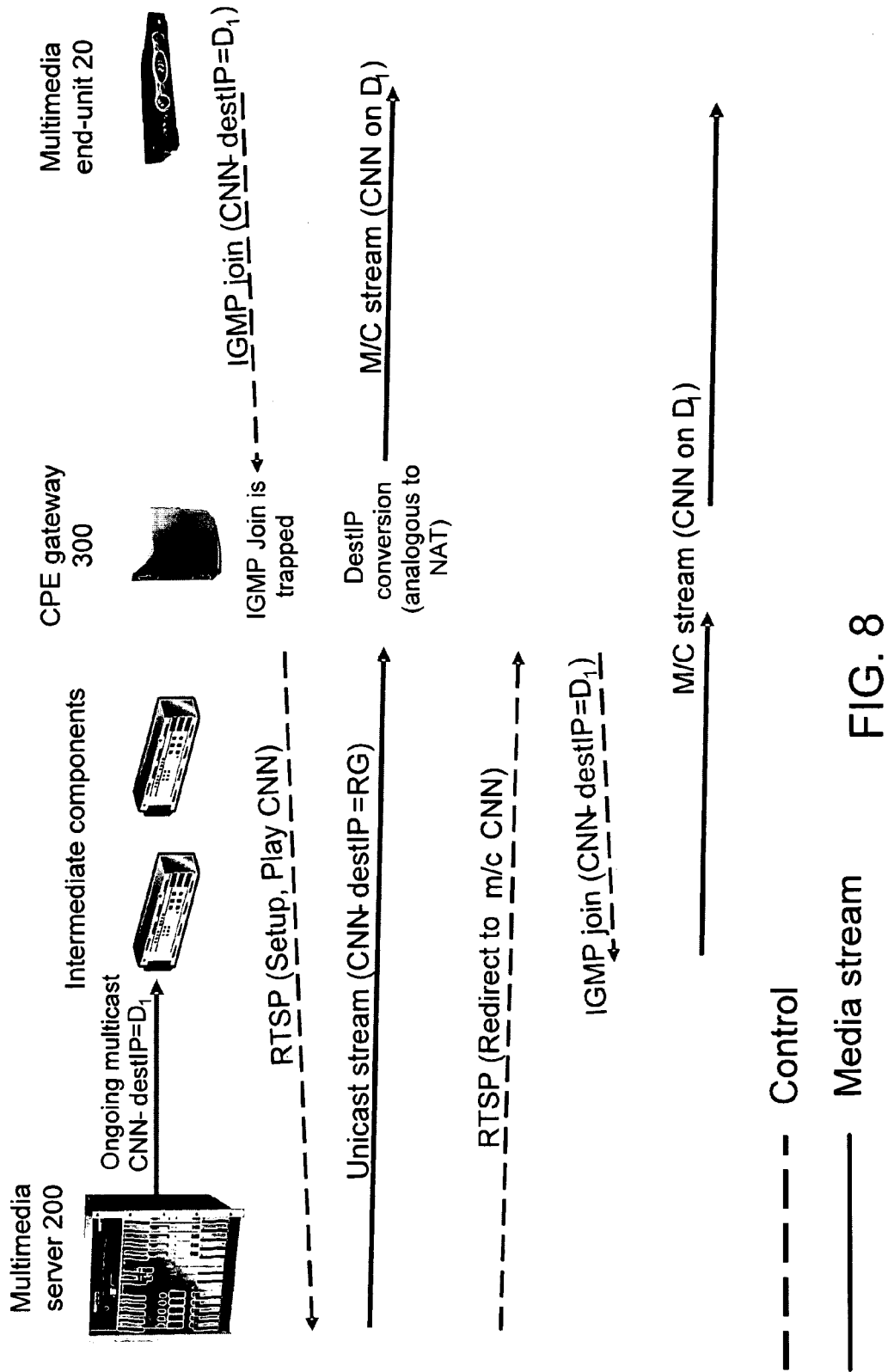
FIG. 8 illustrates multimedia transmission, according to an embodiment of the invention.

FIG. 8 illustrates multimedia transmission, according to an embodiment of the invention. The transmission scenario illustrated may occur, for example, when zapping from a first TV channel (e.g. BBC, not illustrated) to a second TV channel (in this case CNN).

An ongoing multicast media stream is continuously provided (e.g. to at least one of the intermediate components such as network router 50 and/or DSLAM 40). Albeit illustrated as provided by multimedia server 200, it is noted that according to other embodiments of the invention, it may also be provided by another server (e.g. server 60), which in such case usually also transmit the ongoing multicasted multimedia channel to multimedia server 200.

As in the scenario of FIG. 7, The first IGMP compliant command in the illustrated scenario is an IGMP join command indicating the desired multicast group (e.g. CNN channel), and the destination address of multimedia end-unit 20 (denoted $D_1$).

CPE gateway 300 terminates the first IGMP join command, and generates a unicast command (in this case two unicast commands are generated, RTSP setup command, and RTSP play command, indicating the CNN channel). The one or more unicast commands are transmitted to multimedia server 200, which in response generates a unicast media stream that includes a content of the CNN channel, and which is transmitted in unicast to CPE gateway 300.

CPE gateway 300 processes the received media stream (customizes it), in this scenario by conversion of the address, and transmits it as it was a multicast media stream on the address provided by the multimedia end-unit 20, which is led to believe it receives a multicast media stream as expected.

After a while, multimedia server 200 instructs CPE gateway 300 to switch from the transmitted media stream to a second multicast media stream (in this case by an RTSP redirect command), to which CPE gateway 300 responds by generating a second IGMP compliant command (in this case an IGMP join command that is substantially the same as the first IGMP compliant command), wherein the second media stream is provided to the CPE gateway 300 (and by which the multimedia end-unit 20) via the at least one intermediate components (wherein the second multicast media stream may be provided by multimedia server 200 or by another server 60, according to different embodiments of the invention).

Figure 9A:
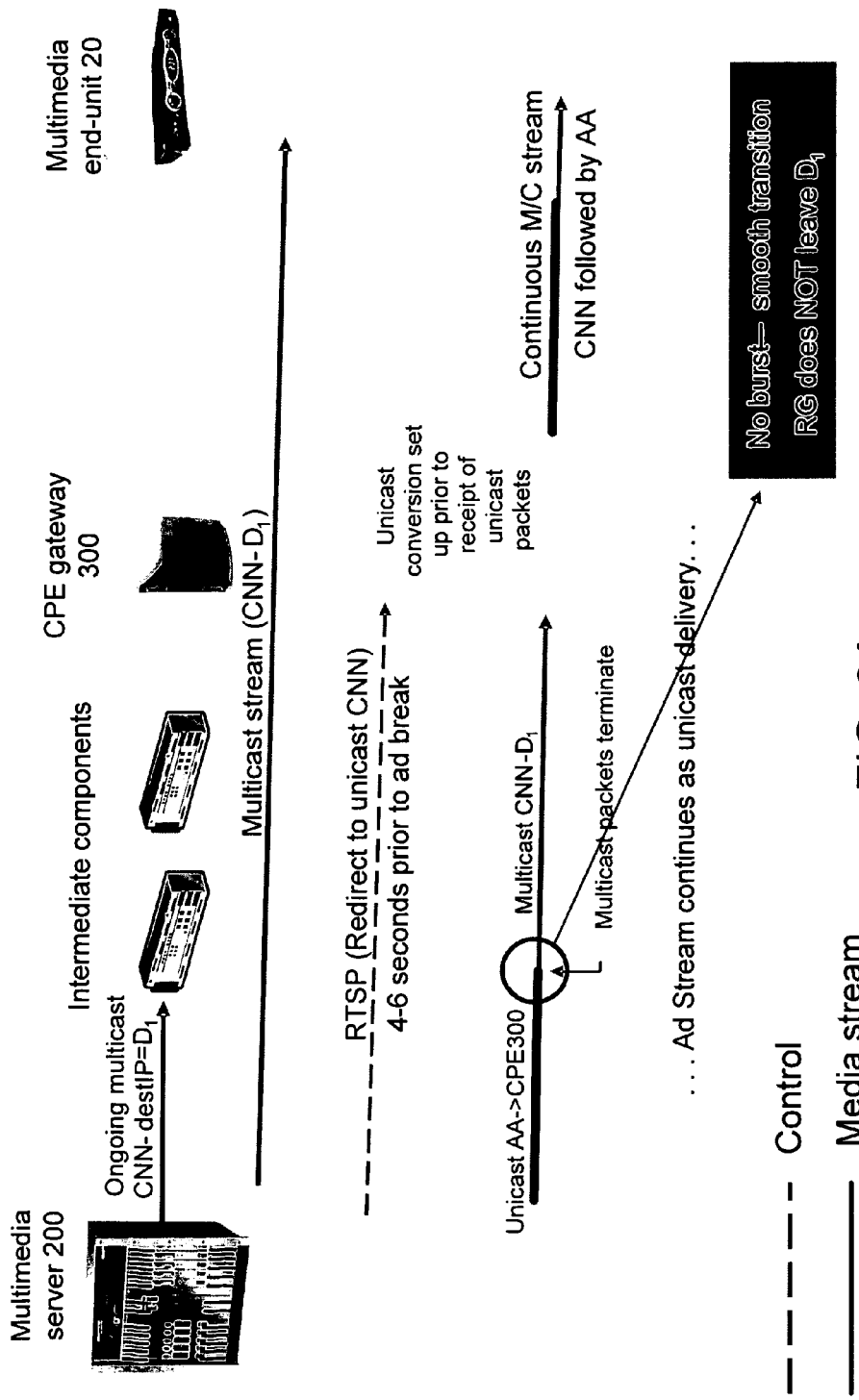
FIGS. 9A and 9B illustrates two scenarios of addressable advertising, according to embodiments of the invention
Figure 9B:
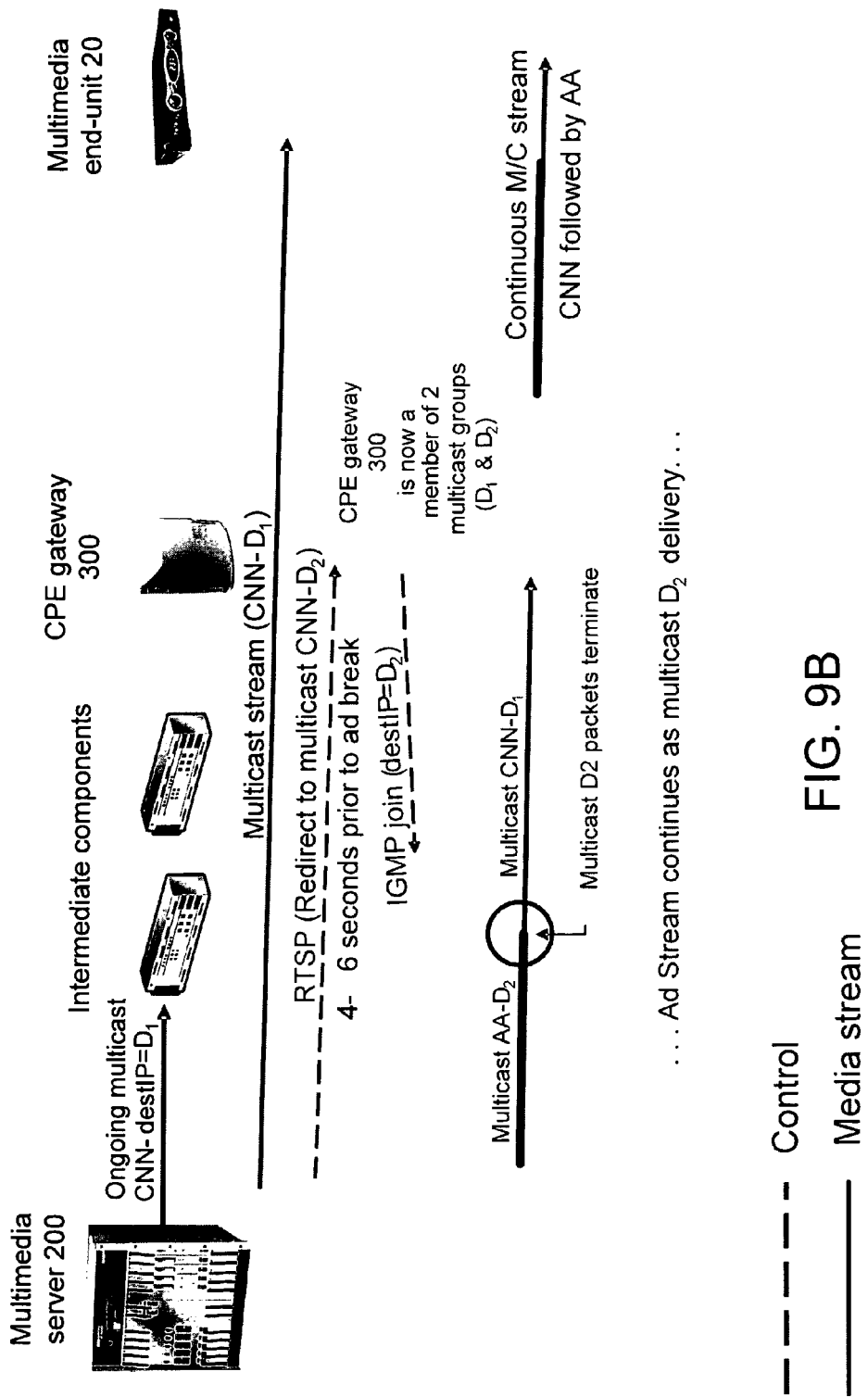

FIGS. 9A and 9B illustrates two scenarios of addressable advertising, according to embodiments of the invention. In the scenario given, many subscribers are concurrently receiving a single multicast media stream (e.g. CNN), when an advertisement break is due. On the first scenario (illustrated in FIG. 9A) the number of subscribers to receive a given advertisement stream is relatively low (below a threshold), and on the second scenario (illustrated in FIG. 9B) the number of subscribers to receive a given advertisement stream is relatively high (above the threshold).

In both of the scenarios, a continuous providing of the ongoing multicast media stream is taking place prior to the as-break, when few seconds before a beginning of an addressable advertisement slot, a second-protocol command is issued by multimedia server 200 to CPE gateway 300.

In the first scenario, an instruction (possibly a second-protocol command) instructs CPE gateway 300 to switch to a reception of a unicast media stream, which is directed to CPE gateway 300, and after which the reception of the ongoing multicast media stream is resumed by CPE gateway 300.

In the second scenario, an instruction (possibly a second protocol command) instructs CPE gateway 300 to switch to reception of a dedicated multicast media stream, to which the CPE gateway 300 responds with a second IGMP compliant command for joining a multicast group associated with the dedicated multicast media stream. CPE gateway 300 conveniently does not leave the prior multicast group (denoted D1), and thus when the transmission of the dedicated multicast media stream ceases, it continues to deliver the first multicast media stream (e.g. standard CNN) to the multimedia end-unit 20.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

I claim:

1. A method for a customer-premises equipment (CPE) gateway, the method comprising:
   receiving, by the CPE gateway, a first Internet Group Management Protocol (IGMP) compliant command;
   generating by the CPE gateway, in response to the first IGMP compliant command, a unicast command that instructs a multimedia server to generate a unicast media stream; wherein the generating comprises concealing multicast information from at least one IGMP compliant entity that follows the CPE gateway; and
   transmitting, by the CPE gateway, the unicast command to the at least one IGMP compliant entity; wherein the unicast command passes through the at least one IGMP compliant entity and reaches the multimedia server;
   wherein the receiving of the first compliant IGMP compliant command comprises receiving the first IGMP compliant command that pertains to a switching from a first multicast media stream to a second multicast media stream; wherein the method further comprises:
   receiving, by the CPE gateway, a unicast media stream that is generated by the multimedia server in response to the unicast request information and to the second multicast media stream; and
   receiving an instruction to switch from the unicast media stream to the second multicast media stream, wherein the instruction comprises timing information.

2. A customer-premises equipment (CPE) gateway, comprising:
   a first interface for receiving a first Internet Group Management Protocol (IGMP) compliant command;
   a processor for generating, in response to the first IGMP command, a unicast command that instructs a multimedia server to generate a unicast media stream; and for concealing multicast information from at least one IGMP compliant entity that follows the CPE gateway; and a second interface for transmitting the unicast command to the at least one IGMP compliant entity; wherein the unicast command passes through the at least one IGMP compliant entity and reaches the multimedia server.

wherein the first IGMP compliant command pertains to a switching from a first multicast media stream to a second multicast media stream;

wherein the second interface is further for receiving: (a) a unicast media stream that is generated by the multimedia server in response to the unicast request information and to the second multicast media stream; and (b) an instruction to switch from the unicast media stream to the second multicast media stream, wherein the instruction comprises timing information.

3. A method for generating a media stream, the method comprising:

receiving by a multimedia server a unicast command; wherein the unicast command is generated by a customer-premises equipment (CPE) gateway in response to an Internet Group Management Protocol (IGMP) command; wherein the unicast command is sent to the multimedia server via the at least one IGMP compliant entity; wherein the unicast command passes through the at least one IGMP compliant entity and reaches the multimedia server;

generating, by the multimedia server, a unicast media stream;

transmitting, by the multimedia server, the unicast media stream to the CPE gateway;

determining, by the multimedia server, media streams switching time metadata;

transmitting to the CPE gateway, by the multimedia server, an instruction to switch from a reception and a transmission of the unicast media stream to a reception and a transmission of a second multicast media stream, wherein the instruction comprises the media streams switching time metadata; and transmitting, by the multimedia server, the second multicast media stream to the CPE gateway, wherein the transmitting of the second multicast media stream starts substantially at a media streams switching time that corresponds to the media streams switching time metadata.

4. The method of claim 3, wherein the generating is preceded by receiving from the CPE gateway, by the multimedia server, a unicast command that instructs the multimedia server to generate the unicast media stream.

5. The method of claim 3, wherein the generating is preceded by determining, by the multimedia server, to transmit to the CPE gateway the media stream in response content of a media stream that is currently transmitted to the CPE gateway.

6. The method of claim 3, wherein the generating comprises generating a dedicated media stream, wherein at least a portion of the content of the dedicated media stream is selected to match user identification information.

7. The method of claim 3, wherein the transmitting of the second multicast media stream is preceded by receiving from the CPE gateway, by the multimedia server, a second IGMP command that instructs the multimedia server to start transmitting the second multicast media stream substantially at the media streams switching time.

8. A multimedia server, comprising:

a media stream generator for generating a unicast media stream;

a first server interface for: receiving from a customer-premises equipment (CPE) gateway a unicast command; wherein the unicast command is generated by the CPE gateway in response to an Internet Group Management Protocol (IGMP) command; wherein the unicast command is sent to the multimedia server via the at least one IGMP compliant entity; wherein the unicast command passes through the at least one IGMP compliant entity and reaches the multimedia server; and for transmitting the unicast media stream to the CPE gateway; and a processor for determining media streams switching time metadata;

wherein the first server interface is further for: transmitting to the CPE gateway an instruction to switch from a reception and a transmission of the unicast media stream to a reception and a transmission of a second multicast media stream, wherein the instruction comprises the media streams switching time metadata; and for transmitting the second multicast media stream to the CPE gateway, wherein the transmitting of the second multicast media stream starts substantially at a media streams switching time that corresponds to the media streams switching time metadata.

9. The multimedia server of claim 8, wherein the first server interface is further for receiving from the CPE gateway a unicast command that instructs the multimedia server to generate the unicast media stream.

10. The multimedia server of claim 8, wherein the processor is further configured to determine, prior to the generating of the unicast media stream, to transmit to the CPE gateway the unicast media stream in response content of a media stream that is currently transmitted to the CPE gateway.

11. The multimedia server of claim 8, wherein the media stream generator is further for generating a dedicated media stream, wherein at least a portion of the content of the dedicated media stream is selected to match user identification information.

12. The multimedia server of claim 8, wherein the first server interface is further for receiving from the CPE gateway, prior to the transmitting of the second multicast media stream, a second IGMP command that instructs the multimedia server to start transmitting the second multicast media stream substantially at the media streams switching time.

* * * * *